United States Patent
Yoshio et al.

(10) Patent No.: US 7,092,618 B2
(45) Date of Patent: Aug. 15, 2006

(54) AUDIO INFORMATION REPRODUCING SYSTEM, AUDIO INFORMATION REPRODUCING APPARATUS AND AUDIO INFORMATION REPRODUCING METHOD

(75) Inventors: Junichi Yoshio, Kawagoe (JP); Tetsuya Tenma, Tokorozawa (JP); Kunihiro Minoshima, Tokorozawa (JP); Sho Murakoshi, Tokorozawa (JP); Hidemi Usuba, Tokorozawa (JP)

(73) Assignee: Pioneer Corporation, Tokyo-To (JP)

( * ) Notice: Subject to any disclaimer, the term of this patent is extended or adjusted under 35 U.S.C. 154(b) by 1091 days.

(21) Appl. No.: 09/795,346

(22) Filed: Mar. 1, 2001

(65) Prior Publication Data
US 2001/0024447 A1 Sep. 27, 2001

(30) Foreign Application Priority Data
Mar. 2, 2000 (JP) ............................. P2000-061895

(51) Int. Cl.
*H04N 7/04* (2006.01)
(52) U.S. Cl. ........................................ 386/96; 386/105
(58) Field of Classification Search ................. 386/96, 386/97, 98, 99, 104, 105, 106, 124, 39, 45, 386/46
See application file for complete search history.

(56) References Cited

U.S. PATENT DOCUMENTS 4,777,537 A * 10/1988 Ueno et al. ................. 386/101

FOREIGN PATENT DOCUMENTS

| EP | 0762684 | 3/1997 |
|----|---------|--------|
| EP | 0833514 | 4/1998 |
| EP | 1045390 | 10/2000 |

OTHER PUBLICATIONS

1394 Trade Association, "Audio and Music Data Transmission Protocol," Version 1.0, May 1997. Retrieved from the Internet: <URL:http//www.1394ta.org/Technology/Specifications/specifications.htm>.

* cited by examiner

*Primary Examiner*—Robert Chevalier
(74) *Attorney, Agent, or Firm*—Drinker Biddle & Reath LLP

(57) ABSTRACT

An audio information reproducing apparatus for reproducing audio information on a recording medium, which can be connected with a bus. In the medium reproducing control information for controlling a reproducing mode of the audio information and the audio information are recorded. The reproducing control information has an amount of information larger than that capable of being inserted into one information unit formed during transmission via the bus. In the apparatus a detecting device detects the audio information and the reproducing control information from the medium. Then, a generating device generates corresponding information indicating a corresponding relationship between the audio information and the reproducing control information. Then, an outputting device forms transmission information including a plurality of the information units including at least any one out of among the audio information, the corresponding information, and one portion of the reproducing control information and outputs the transmission information to the bus.

20 Claims, 18 Drawing Sheets

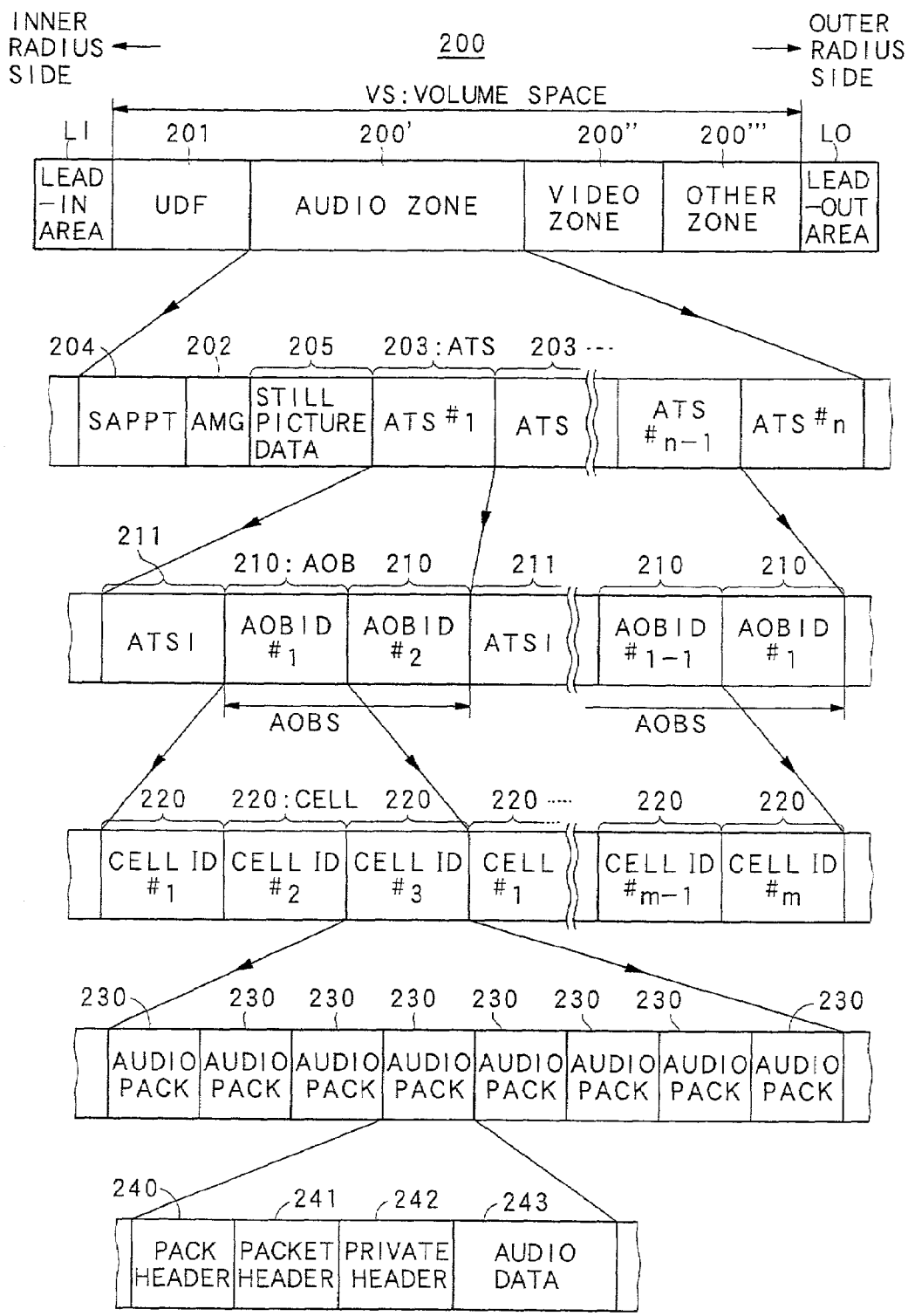

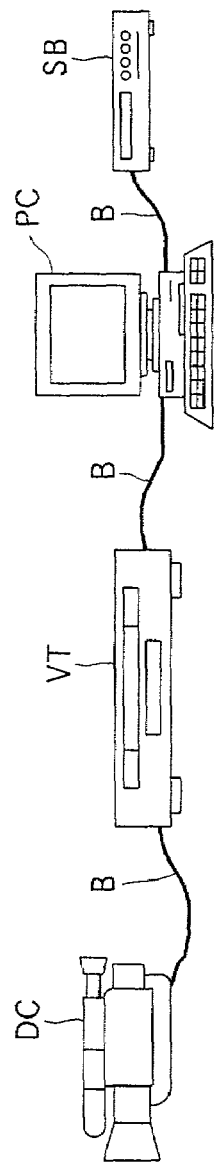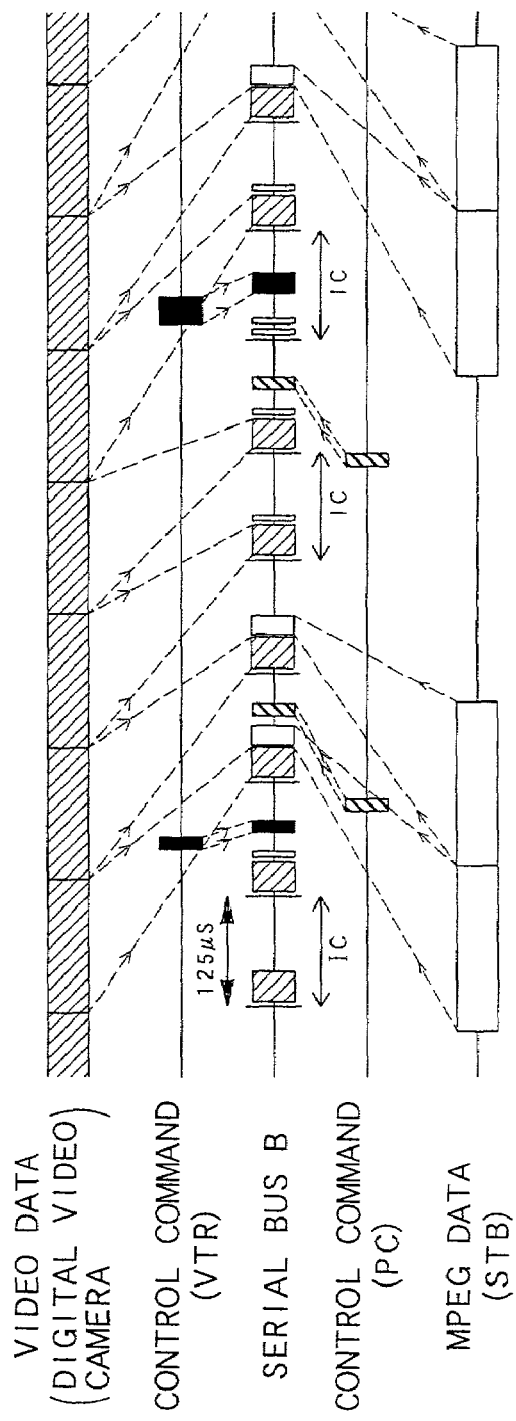

FIG. 11A

| LB1 | ZR | | | | | |
|-----|-----|-----|-----|-----|-----|-----|
| LB2 | ZR | | | | | |
| LB3 | ZR | | | | | |
| LB4 | ZR | | | | | |
| LB5 | ZR | | | | | |
| LB6 | ZR | | | | | |
| LB7 | AR | DRC | DMC | EF | DMM | DMCV | RD |
| LB8 | AR | TPD | ZR | | | | |

| LB1 | ZR | | | | | |
|-----|-----|-----|-----|-----|-----|-----|
| LB2 | ZR | | | | | |
| LB3 | ZR | | | | | |
| LB4 | ZR | | | | | |
| LB5 | ZR | | | | | |
| LB6 | ZR | | | | | |
| LB7 | AR | DRC | DMC | EF | DMM | DMCV | RD |
| LB8 | AR | CT | | | | | |

| LB1 | AD1 | | | | | |
|-----|-----|-----|-----|-----|-----|-----|
| LB2 | AD2 | | | | | |
| LB3 | AD3 | | | | | |
| LB4 | AD4 | | | | | |
| LB5 | AD5 | | | | | |
| LB6 | AD6 | | | | | |
| LB7 | AR | DRC | DMC | EF | DMM | DMCV | RD |
| LB8 | AR | FS2 | MCT | CA | TPA | RD | |

| LB1 | AD1 | | | | | |
|---|---|---|---|---|---|---|
| LB2 | AD2 | | | | | |
| LB3 | AD3 | | | | | |
| LB4 | AD4 | | | | | |
| LB5 | AD5 | | | | | |
| LB6 | AD6 | | | | | |
| LB7 | AR | DRC | DMC | EF | DMM | DMCV | RD |
| LB8 | AR | TPD | ZR | | | | |

| LB1 | AD1 | | | | | |
|---|---|---|---|---|---|---|
| LB2 | AD2 | | | | | |
| LB3 | AD3 | | | | | |
| LB4 | AD4 | | | | | |
| LB5 | AD5 | | | | | |
| LB6 | AD6 | | | | | |
| LB7 | AR | DRC | DMC | EF | DMM | DMCV | RD |
| LB8 | AR | CT | | | | | |

| LB1 | AD1 | | | | | |
|---|---|---|---|---|---|---|
| LB2 | AD2 | | | | | |
| LB3 | AD3 | | | | | |
| LB4 | AD4 | | | | | |
| LB5 | AD5 | | | | | |
| LB6 | AD6 | | | | | |
| LB7 | AR | DRC | DMC | EF | DMM | DMCV | RD |
| LB8 | AR | FS2 | MCT | CA | TPA | RD | |

— DB2'

AUDIO INFORMATION REPRODUCING SYSTEM, AUDIO INFORMATION REPRODUCING APPARATUS AND AUDIO INFORMATION REPRODUCING METHOD

BACKGROUND OF THE INVENTION

1. Field of the Invention

The present invention relates to a technical field of an audio information reproducing system, an audio information reproducing apparatus and an audio information reproducing method. More particularly, the invention relates to the technical field of the audio information reproducing system, the audio information reproducing apparatus and the audio information reproducing method capable of: transmitting both of audio information including voice information and sound information except the voice information and reproducing control information used for controlling a reproducing mode of the audio information; and controlling a reproducing of the audio information using the reproducing control information.

2. Description of the Related Art

In recent years, a DVD whose memory capacity has been enhanced about 7-fold capacity compared to that of a conventional CD (Compact Disk) has come into general use.

Then, as universal standards for digitally recording information in this DVD, a so-called DVD video standard for mainly recording moving picture information such as a movie, and a so-called DVD audio standard for mainly recording high quality audio information have been laid down respectively, these now are being distributed to the concerned such as who prepares moving picture information or who prepares audio information, respectively.

Out of these two standards, in the case of being based on the DVD audio standard, because of its large capacity, for example, control information for the so-called surround reproducing with presence or audio information of three channels or more for it is reproduced at a time, and the surround reproducing can be enjoyed.

In this case, in order to sufficiently enjoy the surround reproducing, it is necessary to use three speakers or more, however, there can be some cases where the user has only a reproducing speaker for right and a reproducing speaker for left.

In order to correspond to such a case, in the DVD audio standard, synthesis coefficients for synthesizing audio information of two channels has been previously prepared as a table by employing audio information of three channels or more and can be recorded with the audio information of the multiple channels in a DVD. Specifically, the audio information of 6 channels is employed in the DVD audio standard described later. The two channels of the synthesized audio information are a channel of reproducing for right side and a channel of reproducing for left side. Further, to reduce the number of channels by the synthesis is generally referred to as down mixing processing.

Now, the synthesis coefficient is a coefficient for synthesizing audio information for right channel and audio information for left channel by multiplying it by a level of audio information of each channel of three channels or more, and in the DVD audio standard, a plurality of kinds of the synthesis coefficients have been prepared as a table and recorded in a DVD.

Moreover, as to the down mixing processing, originally the down mixing processing is performed in the DVD player itself, after making them down-mix-treated for two channels, audio information is outputted to the external. However, in consideration of a simplified DVD player, reproducing in a higher quality may be performed by the procedure such that the above described synthesis coefficient is outputted with audio information of multiple channels of three channels or more into an amplifier without performing the down mixing processing itself in the DVD player, the down mixing processing is carried out in the amplifier and down-mix-treated information is outputted to the speaker, etc. The amplifier is one in which audio information outputted from the DVD player is submitted to amplification processing and the audio information is outputted into the speaker, etc.

On the other hand, in recent years, as a new standard for transmitting information in real time via a serial bus between a plurality of information processing apparatuses, for example, personal computer and digital video camera or MD (Mini Disk) player and the like, the so-called IEEE1394 standard (the officially approved name is "IEEE Std. 1394-1995 IEEE Standard for a High Performance Serial Bus") has been published. A digital video camera, a personal computer and the like equipped with a serial port being in conformity with the standard are being manufactured.

In this IEEE 1394 standard, it is standardized so that by connecting via a serial bus between a plurality of information processing apparatuses (hereinafter, referred to as simply node) such as an optical disk player, an amplifier or the like, transmission of information of the portion of multiple channels is carried out in a time divisional manner between these respective nodes. In the standard, it is standardized that transmission of information can be carried out by employing different 63 channels at the maximum within a system connected via one serial bus.

Now, in the IEEE 1394 standard, in the case where a new other node is connected with the node group mutually connected already via a serial bus one another (i.e., during bus connection), or in the case where one of the nodes is removed from the above described node group (i.e., during bus disconnection), it is standardized that the initialization of a serial bus which is referred to as the so-called bus reset is carried out. Then, a new connection mode (hereinafter, the connection mode is referred to as topology) of a serial bus is constructed in accordance with the predetermined procedure that previously has been set after the bus reset.

Then, in the case where information is actually transmitted after constitution of topology, transmission node and IRM (Isochronous Resource Manager) node are used. The transmission node is a node for initiating transmission of the information. The IRM node is a node for controlling the communication state of all of the nodes within the constituted topology, and displaying a channel used at present and transmission occupying time occupied by each nodes at present so that other node can be distinguish them. Specifically, the communication state which is controlled by the IRM node is a channel used of each node and transmission occupying time described later.

At first, the transmission node inquires of IRM node the communication state of the other nodes at present. Then, if the channel and transmission occupying time which the transmission node itself would like to use can be used, the transmission node acquires the right to transmit information. More concretely, the transmission node secures a channel for use by the transmission node and the transmission occupying time described later. Then, the transmission node initiates the transmission of the information. At the moment, immediately before the transmission of the information, the transmission node transmits the effect that display of the communication state in the above described IRM node is rewritten to the IRM node. Since the occupied channel and transmission occupying time on a serial bus are changed by the transmission node for initiating the transmission of information, it is required that the display contents are rewritten to a new communication state after this change. The IRM node which has received the effect carries out the processes for updating the display contents, respectively. Hereinafter, the display contents after the updating can be made reference from the other nodes, respectively.

Next, the above described transmission occupying time will be briefly described below.

In the IEEE 1394 standard, information from respective nodes are grouped in every unit which is referred to as an isochronous cycle and sent out. The term "cycle" is referred to a cycle formed by dividing in a time diving manner on a serial bus. The isochronous cycle includes: an isochronous transmission region including information transmitted in synchronization with the information within the other isochronous cycle and asynchronous transmission region including information transmitted in asynchronization irrelevant to the other information. Concretely, the information within the isochronous transmission region includes image information, audio information or the like. The information within the asynchronous transmission region includes control information for controlling an output and the like of the above described image information or audio information, and the like. Then, the information within the isochronous transmission region is time-shared in every different channel, and different information in every channel is transmitted, respectively.

In the isochronous transmission region, it is standardized that the time length of isochrouns transmission region within one of the isochronous cycles is 100 μ sec at the maximum. Therefore, it is required that the total time which the information assigned for respective channels within one isochronous transmission region occupies for its transmission is also made to be 100 μ sec. The transmission time which the one channel occupies within an isochronous cycle is the above described transmission occupying time.

It should be noted that the transmission occupying time may be also referred to as a working bandwidth of a serial bus depending on the situation, and may be also referred to as a working capacity of a serial bus.

On the other hand, within one isochronous cycle, when the length of the isochronous transmission region is less than 100 μ sec (including the case of 0), a time within isochronous cycle except the isocrhronous transmission region is exclusively used as an asynchronous transmission region.

According to the IEEE 1394 standard having an outline described above, since the transmission of, for example, copy control information or the like except transmission information can be possible as well as a large capacity of information can be rapidly transmitted not depending on the attribute of image information, audio information or the like in the transmission information to be transmitted, it is possible to transmit information while taking all possible measures to ensure the protection of copyright with respect to the transmission information.

However, in consideration of the case where the above described DVD player and amplifier are connected via the serial bus of the above described IEEE 1394 standard, audio information of a plurality of three channels or more as described above and a synthesis coefficient for down mixing processing are transmitted from the DVD player to the amplifier and the down mixing processing is carried out, there is a problem that since the synthesis coefficient has a large capacity of information, all of the synthesis coefficient cannot be transmitted at a time within the one isochronous cycle described above nor can be the down mixing processing carried out.

Specifically, although the above described synthesis coefficient has been previously set per one audio information of a plurality of channels to be treated by the down mixing processing and recorded in a DVD, since its information is information of a large amount as described above, it cannot be transmitted at a time within one isochronous cycle. Therefore, one synthesis coefficient has only to be resolved and they have to be individually transmitted with time differences by employing a plurality of isochronous cycles, however, in this case, there may be some instances where audio information in the amplifier after transmission and synthesis coefficient to be employed for its down mixing processing cannot be corresponded, and in this case, the down mixing processing cannot be carried out based on the predetermined association.

SUMMARY OF THE INVENTION

Hence, the present invention is performed in consideration of the above described problem, its object is to provide an audio information reproducing system, an audio information reproducing apparatus and an audio information reproducing method which securely transmit the synthesis coefficient even if a synthesis coefficient has an amount of information not capable of being transmitted at a time and which are capable of playing back and controlling audio information based on the precise relationship of the association between audio information and a synthesis coefficient.

The above object of the present invention can be achieved by an audio information reproducing apparatus for reproducing audio information recorded on an information recording medium in accordance with the present invention. The audio information reproducing apparatus is capable of being connected with a bus. The information recording medium wherein reproducing control information for controlling a reproducing mode of the audio information and the audio information are recorded. The reproducing control information has an amount of information larger than that capable of being inserted into one information unit formed during transmission via the bus. The audio information reproducing apparatus includes: a detecting device for detecting the audio information and the reproducing control information from the information recording medium such as DVD audio disc; a generating device such as CPU for generating corresponding information indicating a corresponding relationship between the detected audio information and the detected reproducing control information; and an outputting device for forming transmission information including a plurality of the information units including at least any one out of among the detected audio information, the generated corresponding information and one portion of the detected reproducing control information and for outputting the formed transmission information to the bus.

According to the apparatus, the detecting device detects the audio information and the reproducing control information from the information recording medium such as DVD audio disc. Then, the generating device such as CPU generates corresponding information indicating the corresponding relationship between the detected audio information and the detected reproducing control information. Then, the outputting device forms transmission information including a plurality of the information units including at least any one out of among the detected audio information, the generated corresponding information and one portion of the detected reproducing control information and outputs the formed transmission information to the bus.

Therefore, since it forms an information unit by including at least any one of the audio information, the reproducing control information and the corresponding information and outputs the information unit onto the bus, in the case where the information is received, reproducing and control of the audio information can be performed by associating the reproducing control information with the audio information by utilizing the corresponding information, even if the reproducing control information is one having an amount of information not capable of including in one information unit, and reproducing and control of the audio information can be performed by making the use of the reproducing control information.

In one aspect of the audio information reproducing apparatus, the information unit including the reproducing control information is outputted to the bus at every time interval previously set based on the reproducing mode.

According to this aspect, since an information unit including reproducing control information is outputted at intervals of the time period previously set, the reproducing control information can be securely transmitted.

In another aspect of the audio information reproducing apparatus, the reproducing control information is stored in a synchronous information unit transmitted in synchronization with other information units on the bus and outputted to the bus.

According to this aspect, reproducing control information can be transmitted by a simplified processing.

In another aspect of the audio information reproducing apparatus, the reproducing control information is stored in an asynchronous information unit transmitted in non-synchronization with other information unit on the bus and outputted to the bus.

According to this aspect, reproducing control information can be transmitted one after another when it is necessary.

In another aspect of the audio information reproducing apparatus, the reproducing control information is a channel number reduction control information for reproducing the audio information recorded on the information recording medium by means of two channels or more of a first channel number as audio information of a second channel number less than that of the first channel number.

According to this aspect, reproducing control information for reducing the number of the channels is securely transmitted and audio information can be reproduced by the reduced number of channels.

In another aspect of the audio information reproducing apparatus, the bus is a serial bus through which the transmission information is transmitted based on the IEEE 1394 standard, and the information unit is a unit which constitutes one portion of an isochronous cycle in the IEEE 1394 standard.

According to this aspect, reproducing control information can be securely transmitted under the IEEE 1394 standard.

The above object of the present invention can be achieved by an audio information reproducing apparatus for reproducing audio information recorded on an information recording medium in accordance with the present invention. The audio information reproducing apparatus is capable of being connected with a bus. In the information recording medium reproducing control information for controlling a reproducing mode of the audio information and the audio information are recorded. The reproducing control information has an amount of information larger than that capable of being inserted into one information unit formed during transmission via the bus. The audio information reproducing apparatus includes: an inputting device for inputting transmission information including a plurality of the information units from the bus, each of which includes at least any one out of among the audio information, the reproducing control information, and corresponding information indicating a corresponding relationship between the audio information and the reproducing control information; an extracting device for extracting the information unit from the acquired transmission information; an acquiring device for acquiring the audio information, the reproducing control information and the corresponding information from a plurality of the extracted information units; and a reproducing device for controlling a reproducing mode of the acquired audio information by employing the reproducing control information indicated by the acquired corresponding information.

According to the apparatus, the inputting device inputs transmission information including a plurality of the information units from the bus. Each of the information units includes at least any one out of among the audio information, the reproducing control information, and the corresponding information indicating a corresponding relationship between the audio information and the reproducing control information. Then, the extracting device extracts the information unit from the acquired transmission information. Further, the acquiring device acquires the audio information, the reproducing control information and the corresponding information from a plurality of the extracted information units. Then, the reproducing device controls the reproducing mode of the acquired audio information by employing the reproducing control information indicated by the acquired corresponding information.

Therefore, since the information unit including at least any one of the audio information, the reproducing control information and the corresponding information is transmitted, the audio information can be reproduced and controlled by associating the reproducing control information with the audio information by utilizing the corresponding information acquired by acquiring the information unit, even if reproducing control information is one having an amount of information not capable of including in one information unit, it can be utilized and the audio information can be reproduced and controlled.

In one aspect of the audio information reproducing apparatus, the information unit including the reproducing control information is outputted to the bus at every time interval previously set based on the reproducing mode.

According to this aspect, since an information unit including reproducing control information is outputted at intervals of the time period previously set, the reproducing control information can be securely transmitted.

In another aspect of the audio information reproducing apparatus, the reproducing control information is stored in a synchronous information unit transmitted in synchronization with other information units on the bus and outputted to the bus.

According to this aspect, reproducing control information can be transmitted by a simplified processing.

In another aspect of the audio information reproducing apparatus, the reproducing control information is stored in an asynchronous information unit transmitted in non-synchronization with other information unit on the bus and outputted to the bus.

According to this aspect, reproducing control information can be transmitted one after another when it is necessary.

In another aspect of the audio information reproducing apparatus, the reproducing control information is a channel number reduction control information for reproducing the audio information recorded on the information recording medium by means of two channels or more of a first channel number as audio information of a second channel number less than that of the first channel number.

According to this aspect, reproducing control information for reducing the number of the channels is securely transmitted and audio information can be reproduced by the reduced number of channels.

In another aspect of the audio information reproducing apparatus, the bus is a serial bus through which the transmission information is transmitted based on the IEEE 1394 standard, and the information unit is a unit which constitutes one portion of an isochronous cycle in the IEEE 1394 standard.

According to this aspect, reproducing control information can be securely transmitted under the IEEE 1394 standard.

The above object of the present invention can be achieved by an audio information reproducing system for reproducing audio information recorded on an information recording medium in accordance with the present invention. The audio information reproducing system uses a bus. In the information recording medium, reproducing control information for controlling a reproducing mode of the audio information and the audio information are recorded. The reproducing control information has an amount of information larger than that capable of being inserted into one information unit formed during transmission via the bus. The audio information reproducing system includes a first audio information reproducing apparatus and a second audio information reproducing apparatus being connected with each other via the bus. The first audio information reproducing apparatus includes: a detecting device for detecting the audio information and the reproducing control information from the information recording medium such as DVD audio disc; a generating device such as CPU for generating corresponding information indicating a corresponding relationship between the detected audio information and the detected reproducing control information; and an outputting device for forming transmission information including a plurality of the information units including at least any one out of among the detected audio information, the generated corresponding information and one portion of the detected reproducing control information and for outputting the formed transmission information to the bus. Then, the second audio information reproducing apparatus included: an inputting device for inputting transmission information including a plurality of the information units from the bus, each of the information units including at least any one out of among the audio information, the reproducing control information, and corresponding information indicating a corresponding relationship between the audio information and the reproducing control information; an extracting device for extracting the information unit from the acquired transmission information; an acquiring device for acquiring the audio information, the reproducing control information and the corresponding information from a plurality of the extracted information units; and a reproducing device for controlling a reproducing mode of the acquired audio information by employing the reproducing control information indicated by the acquired corresponding information.

According to the system, in the first audio information reproducing apparatus, the detecting device detects the audio information and the reproducing control information from the information recording medium such as DVD audio disc. Then, the generating device such as CPU generates corresponding information indicating a corresponding relationship between the detected audio information and the detected reproducing control information. Then, the outputting device forms transmission information including a plurality of the information units including at least any one out of among the detected audio information, the generated corresponding information and one portion of the detected reproducing control information and for outputting the formed transmission information to the bus. Next, in the second audio information reproducing apparatus, the inputting device inputs transmission information including a plurality of the information units from the bus. Each of the information units includes at least any one out of among the audio information, the reproducing control information, and corresponding information indicating a corresponding relationship between the audio information and the reproducing control information. Then, the extracting device extracts the information unit from the acquired transmission information. Then, the acquiring device acquires the audio information, the reproducing control information and the corresponding information from a plurality of the extracted information units. Then, the reproducing device controls a reproducing mode of the acquired audio information by employing the reproducing control information indicated by the acquired corresponding information.

Therefore, since the information unit is acquired and a reproducing control is performed as well as an information unit including at least any one of the audio information, the reproducing control information and the corresponding information is formed and outputted to the bus, the audio information can be reproduced and controlled by associating the reproducing control information with the audio information. As a result, even if reproducing control information is one having an amount of information not capable of including in one information unit, it can be utilized and audio information can be precisely played back and controlled.

The above object of the present invention can be achieved by an audio information reproducing method of reproducing audio information recorded on an information recording medium in accordance with the present invention. The audio information reproducing method uses a bus. In the information recording medium, reproducing control information for controlling a reproducing mode of the audio information and the audio information are recorded. The reproducing control information has an amount of information larger than that capable of being inserted into one information unit formed during transmission via the bus. The audio information reproducing method includes the processes of: detecting the audio information and the reproducing control information from the information recording medium such as DVD audio disc; generating corresponding information indicating a corresponding relationship between the detected audio information and the detected reproducing control information; forming transmission information including a plurality of the information units including at least any one out of among the detected audio information, the generated corresponding information and one portion of the detected reproducing control information; and outputting the formed transmission information to the bus.

According to the audio information reproducing method, the audio information and the reproducing control information is detected from the information recording medium such as DVD audio disc. Then, the corresponding information indicating a corresponding relationship between the detected audio information and the detected reproducing control information is generated. Then, transmission information including a plurality of the information units including at least any one out of among the detected audio information, the generated corresponding information and one portion of the detected reproducing control information is formed and outputted to the bus.

Therefore, since the information unit including at least any one of the audio information, the reproducing control information and the corresponding information is transmitted, the audio information can be reproduced and controlled by associating the reproducing control information with the audio information by utilizing the corresponding information acquired by acquiring the information unit. As a result, even if the reproducing control information is one having an amount of information not capable of including it in one information unit, the audio information can be precisely reproduced and controlled by utilizing it.

The above object of the present invention can be achieved by an audio information reproducing method of reproducing audio information recorded on an information recording medium in accordance with the present invention. The audio information reproducing method uses a bus. In the information recording medium, reproducing control information for controlling a reproducing mode of the audio information and the audio information are recorded. The reproducing control information has an amount of information larger than that capable of being inserted into one information unit formed during transmission via the bus. The audio information reproducing method comprising the processes of: inputting transmission information including a plurality of the information units from the bus, each of the information units including at least any one out of among the audio information, the reproducing control information, and corresponding information indicating a corresponding relationship between the audio information and the reproducing control information; extracting the information unit from the acquired transmission information; acquiring the audio information, the reproducing control information and the corresponding information from a plurality of the extracted information units; and controlling a reproducing mode of the acquired audio information by employing the reproducing control information indicated by the acquired corresponding information.

According to audio information reproducing method, transmission information including a plurality of the information units is inputted from the bus. Each of the information units includes at least any one out of among the audio information, the reproducing control information, and corresponding information indicating a corresponding relationship between the audio information and the reproducing control information. Then, the information unit is extracted from the acquired transmission information. Then, the audio information, the reproducing control information and the corresponding information are acquired from a plurality of the extracted information units. Then, a reproducing mode of the acquired audio information is controlled by employing the reproducing control information indicated by the acquired corresponding information.

Therefore, since the information unit is acquired and the reproducing control is performed as well as an information unit including at least any one of the audio information, the reproducing control information and the corresponding information is formed and outputted onto the bus, the audio information can be reproduced and controlled by associating the reproducing control information with the audio information. As a result, even if reproducing control information is one having an amount of information not capable of including in one information unit, the audio information can be precisely reproduced and controlled by utilizing it.

The above object of the present invention can be achieved by an audio information reproducing method of reproducing audio information recorded on an information recording medium in accordance with the present invention. The audio information reproducing method uses a bus. In the information recording medium, reproducing control information for controlling a reproducing mode of the audio information and the audio information are recorded. The reproducing control information is one having an amount of information larger than that capable of being inserted into one information unit formed during transmission via the bus. The audio information reproducing method includes a first audio information reproducing method and a second audio information reproducing method. The first audio information reproducing method includes the processes of: detecting the audio information and the reproducing control information from the information recording medium such as DVD audio disc; generating corresponding information indicating a corresponding relationship between the detected audio information and the detected reproducing control information; forming transmission information including a plurality of the information units including at least any one out of among the detected audio information, the generated corresponding information and one portion of the detected reproducing control information; and outputting the formed transmission information to the bus. Then, the second audio information reproducing method includes the processes of: inputting transmission information including a plurality of the information units from the bus, each of the information units including at least any one out of among the audio information, the reproducing control information, and corresponding information indicating a corresponding relationship between the audio information and the reproducing control information; extracting the information unit from the acquired transmission information; acquiring the audio information, the reproducing control information and the corresponding information from a plurality of the extracted information units; and controlling a reproducing mode of the acquired audio information by employing the reproducing control information indicated by the acquired corresponding information.

According to audio information reproducing method, in the first audio information reproducing method, the audio information and the reproducing control information is detected from the information recording medium such as DVD audio disc. Then, the corresponding information indicating a corresponding relationship between the detected audio information and the detected reproducing control information is generated. Then, the transmission information including a plurality of the information units including at least any one out of among the detected audio information, the generated corresponding information and one portion of the detected reproducing control information is formed and outputted to the bus. Next, in the second audio information reproducing method, transmission information including a plurality of the information units is inputted from the bus. Each of the information units includes at least any one out of among the audio information, the reproducing control information, and the corresponding information indicating a corresponding relationship between the audio information and the reproducing control information. Then, the information unit is extracted from the acquired transmission information. Then, the audio information, the reproducing control information and the corresponding information are acquired from a plurality of the extracted information units.

Then, the reproducing mode of the acquired audio information is controlled by employing the reproducing control information indicated by the acquired corresponding information.

Therefore, since the information unit is acquired and the reproducing control is performed as well as an information unit including at least any one of the audio information, the reproducing control information and the corresponding information is formed and outputted onto the bus, the audio information can be reproduced and controlled by associating the reproducing control information with the audio information. As a result, even if reproducing control information is one having an amount of information not capable of including in one information unit, the audio information can be precisely reproduced and controlled by utilizing it.

BRIEF DESCRIPTION OF THE DRAWINGS

FIG. 1 is a diagram showing a recording format of a DVD audio disk;

FIG. 3 is a drawing exemplifying a transmission mode on a serial bus;

FIG. 11A is a diagram exemplifying a constitution of a data block of the first embodiment of the present invention (I);

FIG. 11B is a diagram exemplifying a constitution of a data block of the first embodiment of the present invention (II);

FIG. 11C is a diagram exemplifying a constitution of a data block of the first embodiment of the present invention (III);

FIG. 14A is a diagram exemplifying a constitution of a data block of the third embodiment of the present invention (I);

FIG. 14B is a diagram exemplifying a constitution of a data block of the third embodiment of the present invention (II);

FIG. 14C is a diagram exemplifying a constitution of a data block of the third embodiment of the present invention (II);

DESCRIPTION OF THE PREFERRED EMBODIMENTS

Figure 2A:
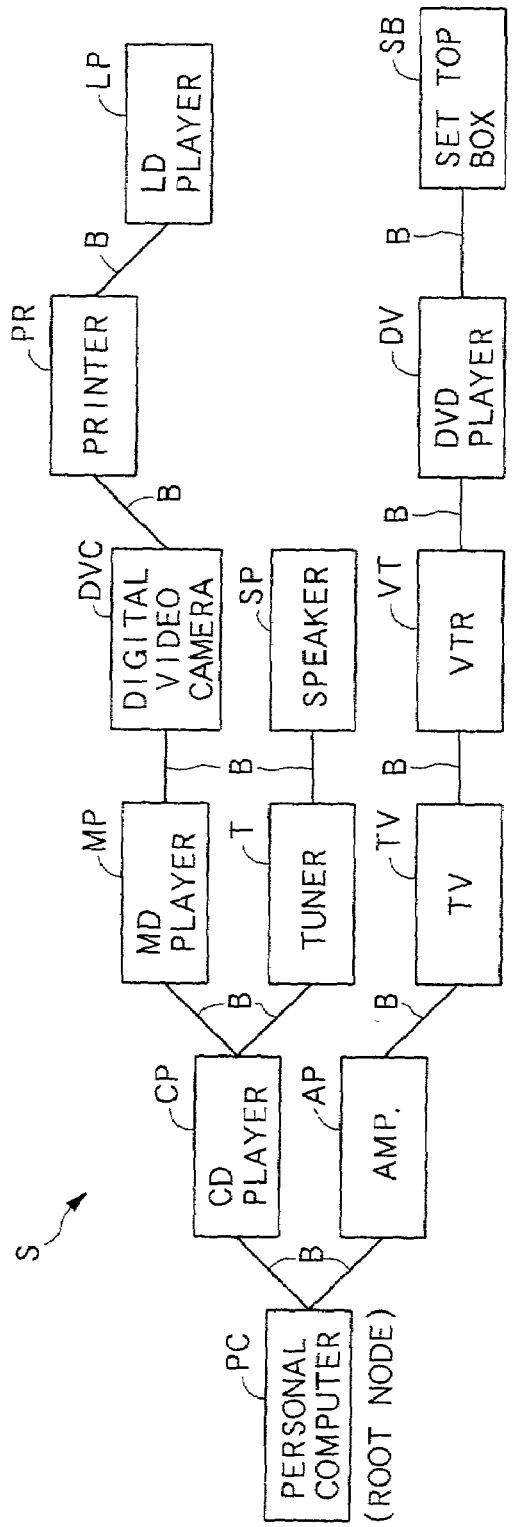
FIG. 2A is a diagram showing an instance of electrical appliances (nodes) connected in serial according to the IEEE 1394 standard.

The preferred embodiments of the present invention will be described below based on the appended drawings.

(I) Description of the Premises

To begin with, prior to describing concrete embodiments of the present invention, the DVD audio standard and the IEEE 1394 standard which are the premises described above will be described below.

(i) On the DVD Audio Standard

First, the DVD audio standard of the embodiments of the present invention will be described below by employing FIG. 1.

It should be noted that FIG. 1 is a diagram showing a recording format when audio information is recorded in a DVD audio disk described later based on the DVD audio standard.

As shown in FIG. 1, a DVD audio disk 200 which is an optical disk as an information recording medium where audio information is recorded on the basis of the DVD audio standard has a lead-out area LO in its outermost radius portion as well as it has a lead-in area LI in its innermost radius portion and one volume space VS is formed between them.

Then, within the volume space VS, a UDF (Universal Disk Format) 201 including information for managing a file construction of audio information recorded in the DVD audio disk 200 from the side of the lead-in area L1, at least one audio zone 200' including audio information and still picture information related to the audio information, at least one video zone 200" including moving picture information or sub-picture information (e.g., referred to letter information such as caption and the like displayed in the moving picture) and the other zone 200''' including information except image information or audio information (e.g., simply a letter information and the like) are formed.

Audio information included in the audio zone 200' is divided into a plurality of ATSs (Audio Title Set) 203 (ATS#1-ATS#n) having ID (identification) numbers respectively, further, in the portions except the ATS 203 in the audio zone 200', a SAPPT (Simple Audio Play Pointer Table) 204 (this SAPPT 204 is necessarily recorded in all of the DVD audio disk 200 having the audio zone 200') which is a necessary information for playing back audio information in multiple channels, an AMG (Audio Manager) 202 which is a necessary information for the reproducing processing of title group described later, recorded in the audio zone 200', still picture data 205 which is data of a still picture corresponding to audio information included in the audio zone 200' are recorded from the top of the audio zone 200'.

In the SAPPT 204, the start address, the ending address and the top of PTS (Presentation Time Stamp) of each track indicating the recording position on the DVD audio disk 200 of all of the tracks (tunes) which can be reproduced by multiple channels and track reproducing time and the like are recorded.

Moreover, in the AMG 202, the information related to the whole of the audio information recorded in the DVD audio disk 200, for example, such as a menu for promoting the item selection of audience and viewers, information for preventing unlawful copies, or an access table for performing reproducing processing to the respective titles are recorded.

One ATS 203 is consisted of a plurality of AOBs (Audio Objects) 210 having ID numbers respectively, in which ATSI (Audio Title Set Information) 211 is set as information at the top.

The portion consisted of a multiple AOBs 210 is generally referred to as AOB set (AOBS). This AOB set is a set for treating an entity portion of audio information distinguishably from the other control information and the like.

The ATSI 211 recorded in the top of the ATS 203, information such as a ATSPGCI (Audio Title Set Program Chain Information) which is a variety of information concerning with program chain that is a logical segment combining a plurality of cells (cell will be described later) and the like are recorded.

It should be noted that synthesis coefficient table (Down Mix Coefficient Table; DMCT) CT as reproducing control information required in the down mix processing described later is different per each ATS 203, and included per each of the ATS 203 in the ATSI 211. One synthesis coefficient table includes six synthesis coefficients as a set to be multiplied by respective audio information of six channels recorded in the DVD audio disk 200 based on the DVD audio standard and performed by down mix processing.

Each AOB 210 includes an entity portion of the audio information. And then, one AOB 210 is consisted of a plurality of cells 220 having ID numbers, respectively.

One cell 220 is consisted of a plurality of audio packs 230 which are the bottom of hierarchical structure and packed respectively. The audio pack 230 is a pack that audio information to be recorded in the DVD audio disk 200 is packed per each of a predetermined amount.

It should be noted that information concerning with composers and copyright, text information such as the title of a tune and the words of a song, access information for accessing to a homepage on the internet, BPM (Beat Per Minute) or real time information pack including beat information and the like except the above described audio pack 230 can be included within one cell 220 instead of one or a plurality of audio packs 230.

One audio pack 230 includes, from its top of it, a pack header 240, a packet header 241 including an ID number for identifying a packet based on the form referred to as a private stream 1 in accordance with the DVD audio standard including audio information and the like, a private header 242 and audio data 243 which is an entity portion of audio information. The private header 242 includes an ID number for identifying that the audio information is actually included in the audio pack 230 and output control data for controlling a reproducing mode and the like. The reproducing mode is a mode when for example, a digital signal transmitted by an amplifier AP described later corresponding to the DVD audio standard is converted, amplified, and reproduced as a sound information by a speaker after audio information reproduced from the DVD audio disk 200 by a DVD player DV described later is transmitted according to the IEEE 1394 standard. Concretely, the reproducing mode includes the number of channels during reproducing, whether or not reproduced by providing an emphasis processing, or whether or not reproduced by performing a control of dynamic range or the like.

Then, in each embodiment described later, it is constituted so that after output control data included within the private header 242 described above is transmitted with the reproduced audio information, and audio information is subjected to a variety of processes based on the output control data in the above described amplifier to which the output control data is transmitted, it is outputted as a sound information.

(ii) On the IEEE 1394 Standard

Next, an information transmission by a serial bus as a bus based on the IEEE 1394 standard (hereinafter, referred to as simply the serial bus standard) of the embodiment of the present invention will be generally described below by employing FIG. 2 to FIG. 4.

Figure 4:
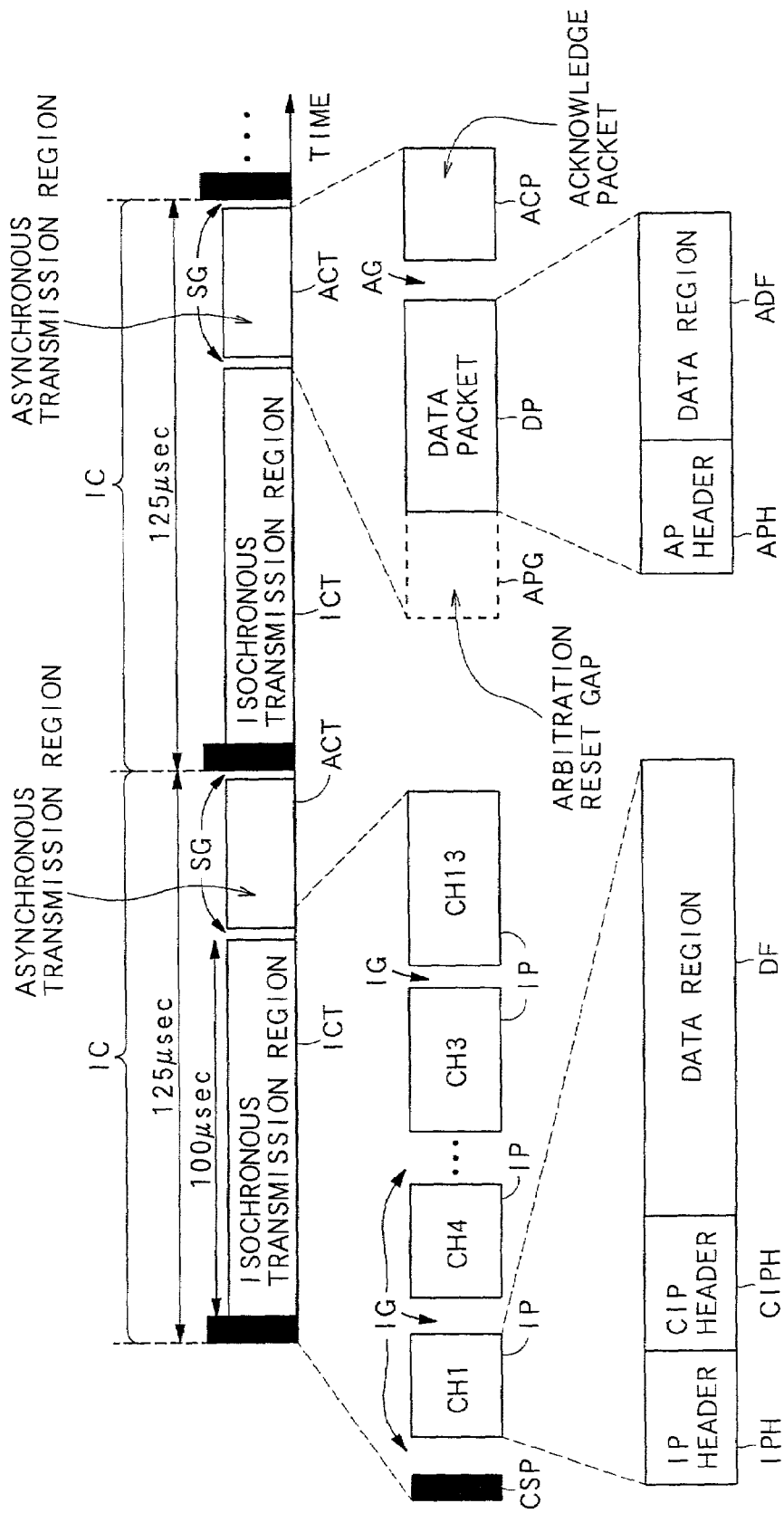
FIG. 4 is a diagram showing a constitution of an isochronous cycle.

It should be noted that FIG. 2 is a diagram exemplifying one form of topology in the serial bus standard, FIG. 3 is a diagram exemplifying a transmission mode on the serial bus, and FIG. 4 is a diagram showing a constitution of an isochronous cycle.

The above described serial bus standard is a serial bus standard for connecting the whole information processing equipment including a variety of electrical appliances which are existing or will be contemplated in the future in serial and performing transmitting and receiving of information mutually.

More concretely, the settings of respective nodes during connection are all automatically performed, and further a new node can be connected without switching off the electric source.

In the mode of an information transmission a high speed transmission can be performed in the range of 100 Mbps (bit per second) and 3.2 Gbps, and further various kinds of information can be transmitted by real time transmission, two-way transmission and multi-channel transmission.

Moreover, as to the form of connection of each node, as an information transmission system shown in FIG. 2A, for example, a personal computer PC is positioned as a root node (the vertex node in a tree shaped topology shown as FIG. 2A), a variety of electrical appliances such as a CD player CP, a MD player MP, a digital video camera DVC, a printer PR, LD (Laser Disc) player LP, a tuner T, a speaker SP, an amplifier AP, a television equipment TV, a digital video tape recorder VT, a DVD player DV and a set top box SB for receiving broadcasting wave are connected via a serial bus B as a data bus, and these electrical appliances can be integrally controlled by the personal computer PC.

Figure 2B:
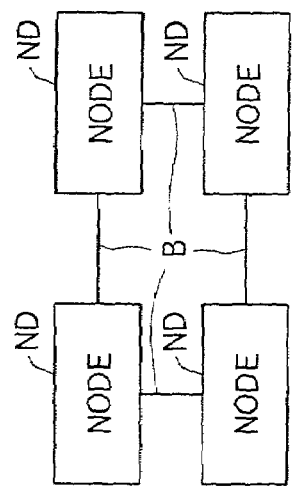
FIG. 2B is a diagram showing an instance of electrical appliances (nodes) connected in a loop according to the IEEE 1394 standard.

In the serial bus standard, the number of information processing equipment (corresponding to the above described nodes) which can be included in one system (a system connected in a tree shape via the serial bus) is 63 pieces at the maximum, and further, connections between two nodes can be included in one system. It should be noted that it is prohibited according to the standard that a plurality of nodes ND are connected in a loop shape as shown in FIG. 2B.

An actual transmission mode will be described below while concretely exemplifying it.

As shown in FIG. 3A, a digital video camera DVC, a digital video tape recorder VT, a personal computer PC and a set top box SB are connected via the serial bus B mutually as respective nodes, so that transmissions of information are performed. More concretely, video data is sent out from the digital video camera DVC, a predetermined control command is sent out from the digital video tape recorder VT, a control command for controlling other devices is similarly sent out form the personal computer PC, an image data included in the received broadcasting wave (e.g., a MPEG data compressed according to the MPEG (Moving Picture Expert Group) standard) is sent out from the set top box SB, onto the serial bus B, respectively.

In this case, as a transmission form of each information sent out on the serial bus B, as shown in FIG. 3B, information from each node is transmitted onto the serial bus while occupying respectively in a time division manner. And then, each information is inserted within the above described isochronous cycle IC which has a length of 125 μ sec is synchronous unit on the serial bus B, and sent out.

Next, a data structure within the above described isochronous cycle IC will be described below by utilizing FIG. 4.

As shown in FIG. 4, the isochronous cycle IC is consisted of a cycle start packet CSP always inserted at the top of the isochronous cycle IC in order to synchronize the reference time of all of the nodes, an isochronous transmission region ICT constituted of multi-channel of the isochronous packets IP respectively including information synchronized in a time, and an asynchronous transmission region ACT in which non-synchronized information (e.g., response information corresponding to various kinds of control information and the respective control information and the like) are included.

Moreover, in the rear tail end of each isochronous transmission region ICT and in the rear end of asynchronous transmission region ACT, a sub action gap SG which is a time gap indicating the ending of one isochronous transmission region ICT or the ending of one asynchronous transmission region ACT is inserted. Furthermore, the isochronous gap IG which is a time gap indicating the ending of the respective packets is inserted between the respective isochronous packets IP and between the cycle start packet CSP and the top isochronous packet IP. The length of the above described sub action gap SG is set longer than that of the isochronous gap IG.

One isochronous packet IP is consisted of an IP (Isochronous Packet) header IPH including information indicating an amount of data within each isochronous packet IP and information indicating the channel transmitting the information within the respective siochronous packet IP, a CIP header CIPH described later and a data region DF including an actual picture image information or audio information.

On the other hand, the asynchronous transmission region ACT is consisted of an arbitration reset gap APG which is a time gap used for each node to indicate its intention of the effect that information from each node has been sent out, a data packet DP including data of control information transmitted in an asynchronous manner, and an acknowledge packet ACP including data employed for a return from the node to which data is sent out. An asynchronous gap AG which is a time gap indicating the ending of one data packet DP is inserted between the data packet DP and the acknowledge packet ACP.

One data packet DP is consisted of AP (Asynchronous Packet) header APH including information indicating a destination of each data packet DP, a data region ADF including information indicating transmission occupying time of data packet DP occupying the asynchronous transmission region ACT and information indicating a channel to be occupied or an actual control information and the like.

According to the above described serial bus standard, image information, audio information or the like is also capable of being rapidly and precisely transmitted mutually between the respective nodes, as well as sound and picture image equipment such as household electrical appliances, a DVD player or the like can be controlled in a unified manner by transmitting a control information and the like in a high speed from information processing equipment such as a personal computer and the like.

(II) First Embodiment

Next, the first embodiment of the present invention based on premises described above will be described below with reference to FIG. 5 to FIG. 11.

In each embodiment described below, the present invention is applied to a system in which the audio information and image information is reproduced from the DVD audio disk 200 in which audio information, image information and the like are recorded in accordance with the above described DVD audio standard and outputted to the external. Further, in each embodiment described below, the DVD player DV as one of the nodes transmitting the reproduced audio information in accordance with the above described serial bus standard and the amplifier AP as one of the nodes performing amplification processing to the transmitted audio information for outputting it to the external are connected via the serial bus B in conformity with the above described serial bus standard (see FIG. 2A). Furthermore, in each embodiment described below, the audio information of a plurality of channels of three channels or more (concretely, six channels) from the DVD player DV is converted into a two-channel audio information in the amplifier AP, i.e., by performing the above described down mix processing and outputted.

Figure 5:
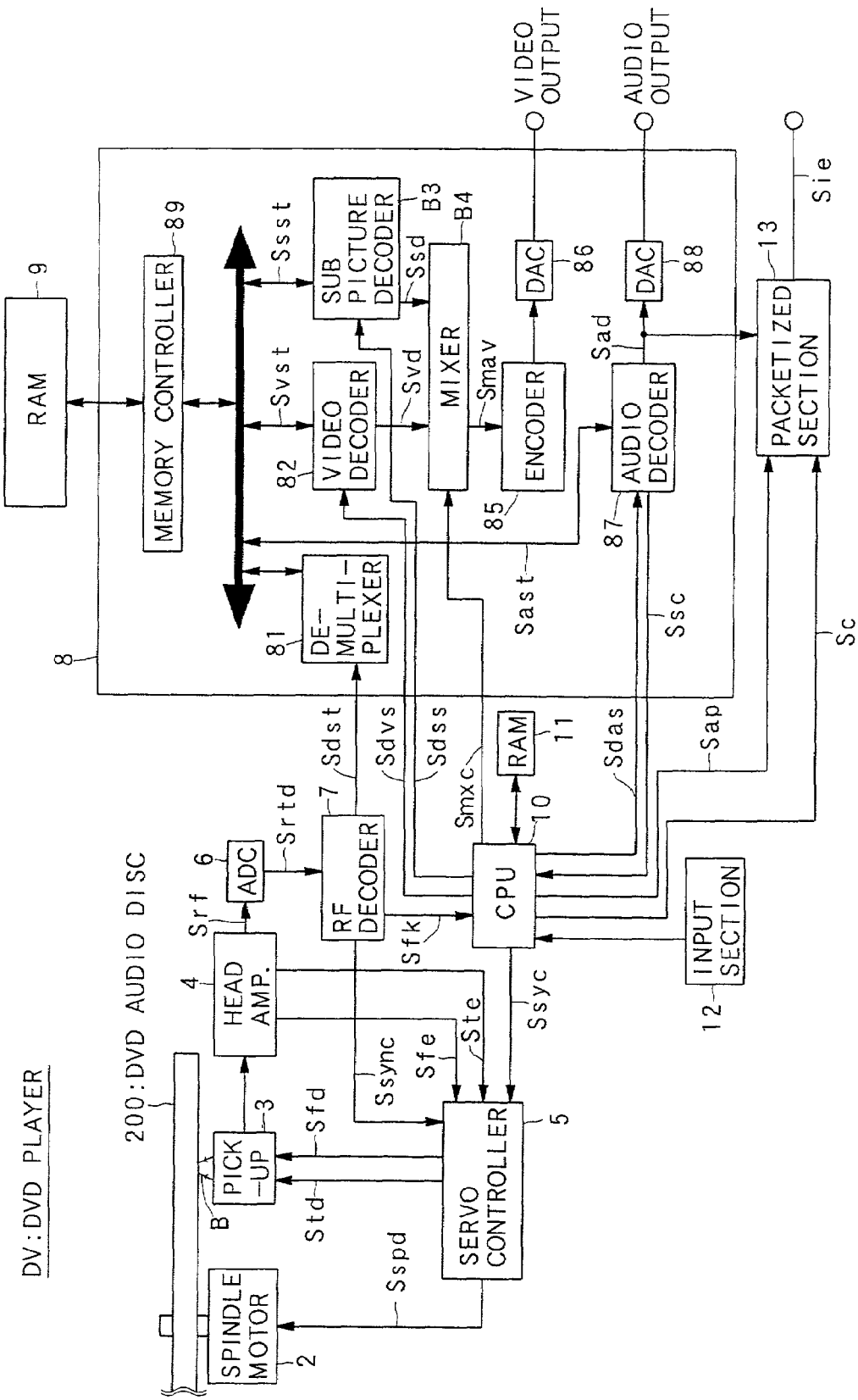
FIG. 5 is a block diagram showing an outline constitution of a DVD player of a first embodiment of the present invention.
Figure 6:
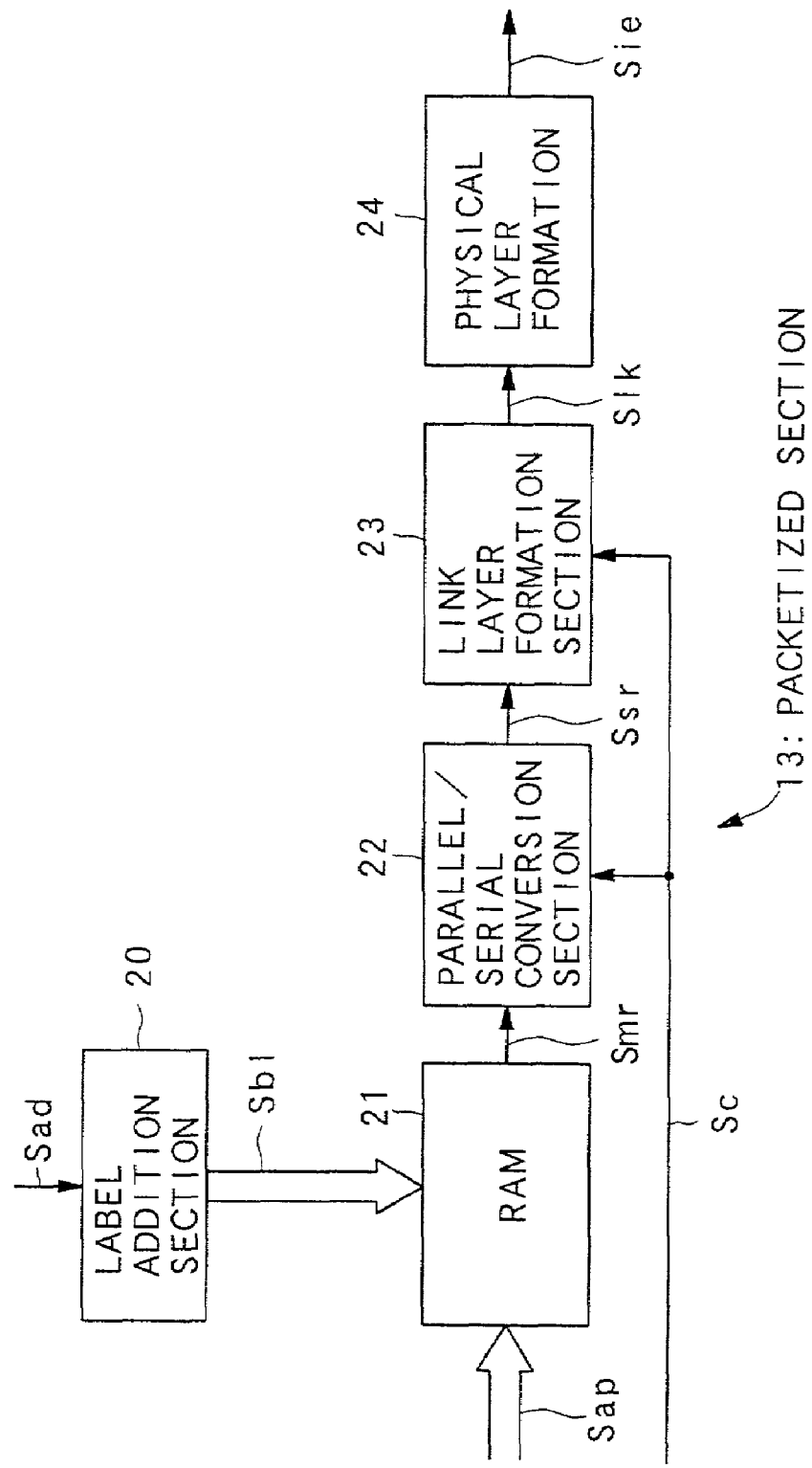
FIG. 6 is a block diagram showing an outline constitution of a packetized section of the first embodiment of the present invention.
Figure 7:
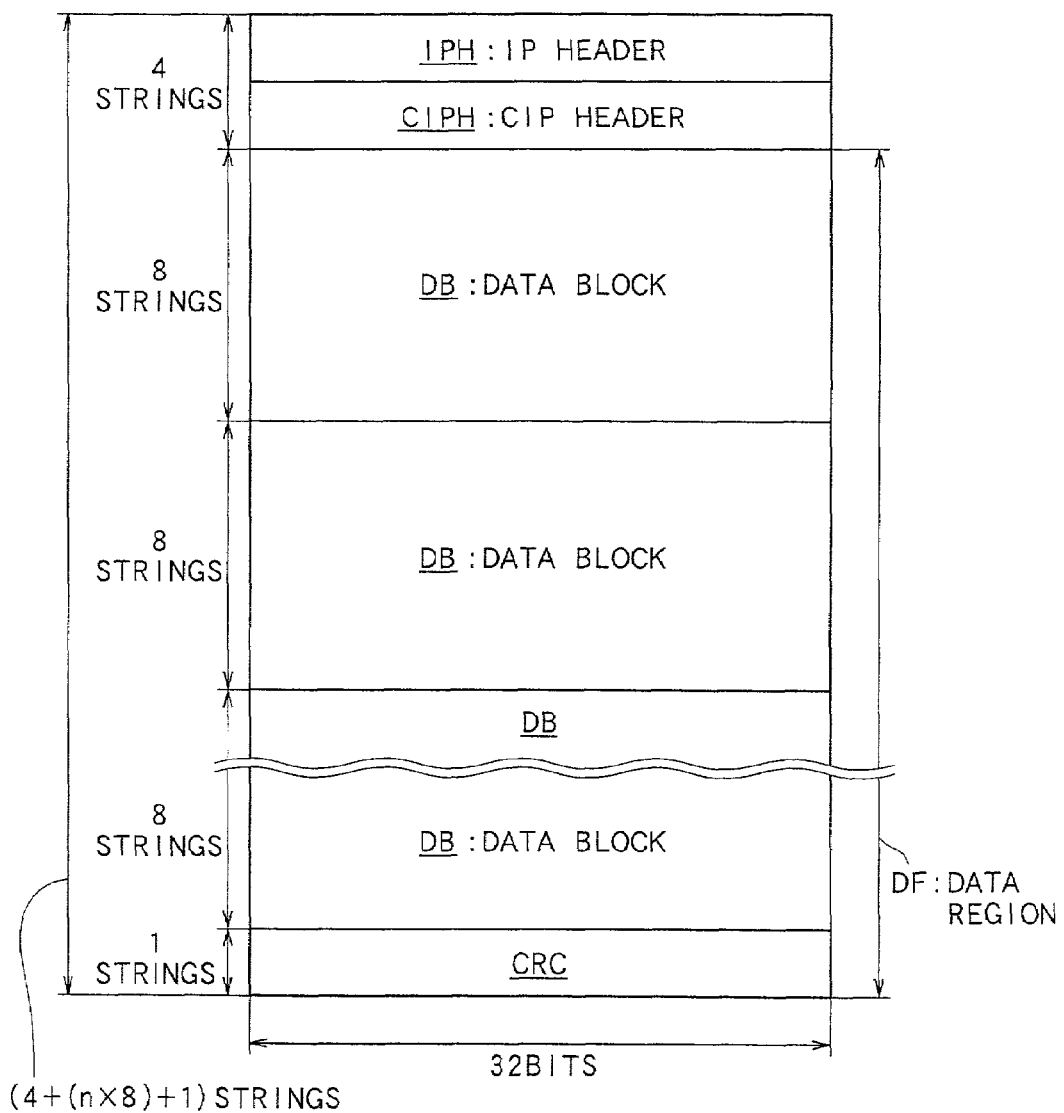
FIG. 7 is a diagram exemplifying a constitution of an isochronous packet of the first embodiment of the present invention.
Figure 8:
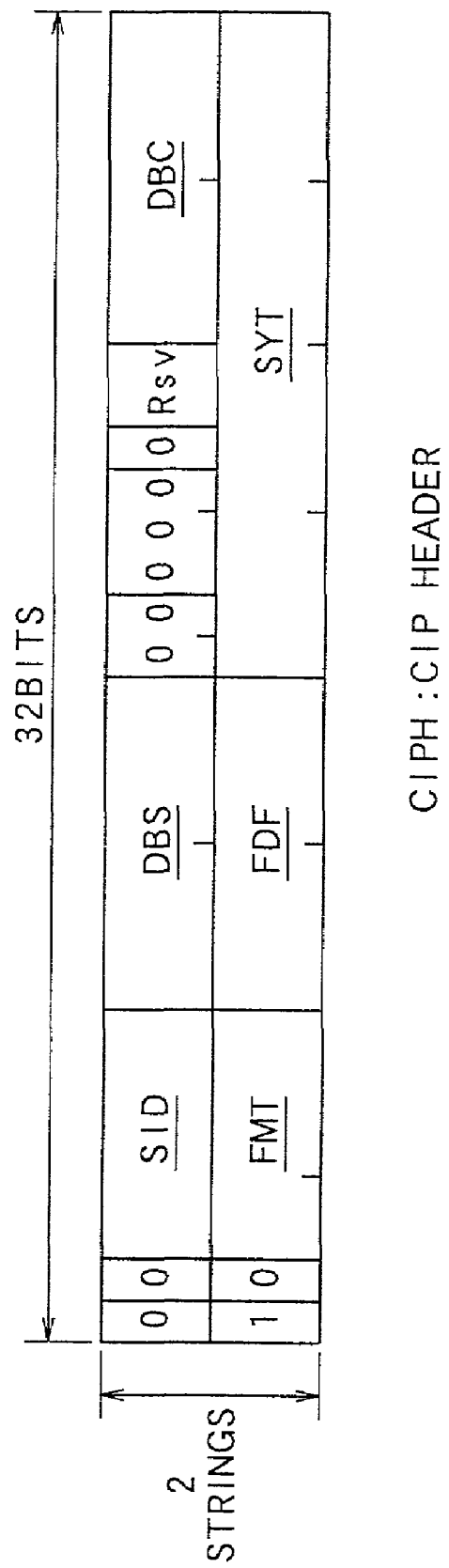
FIG. 8 is a diagram exemplifying a constitution of a CIP header of the embodiment of the present invention.
Figure 9:
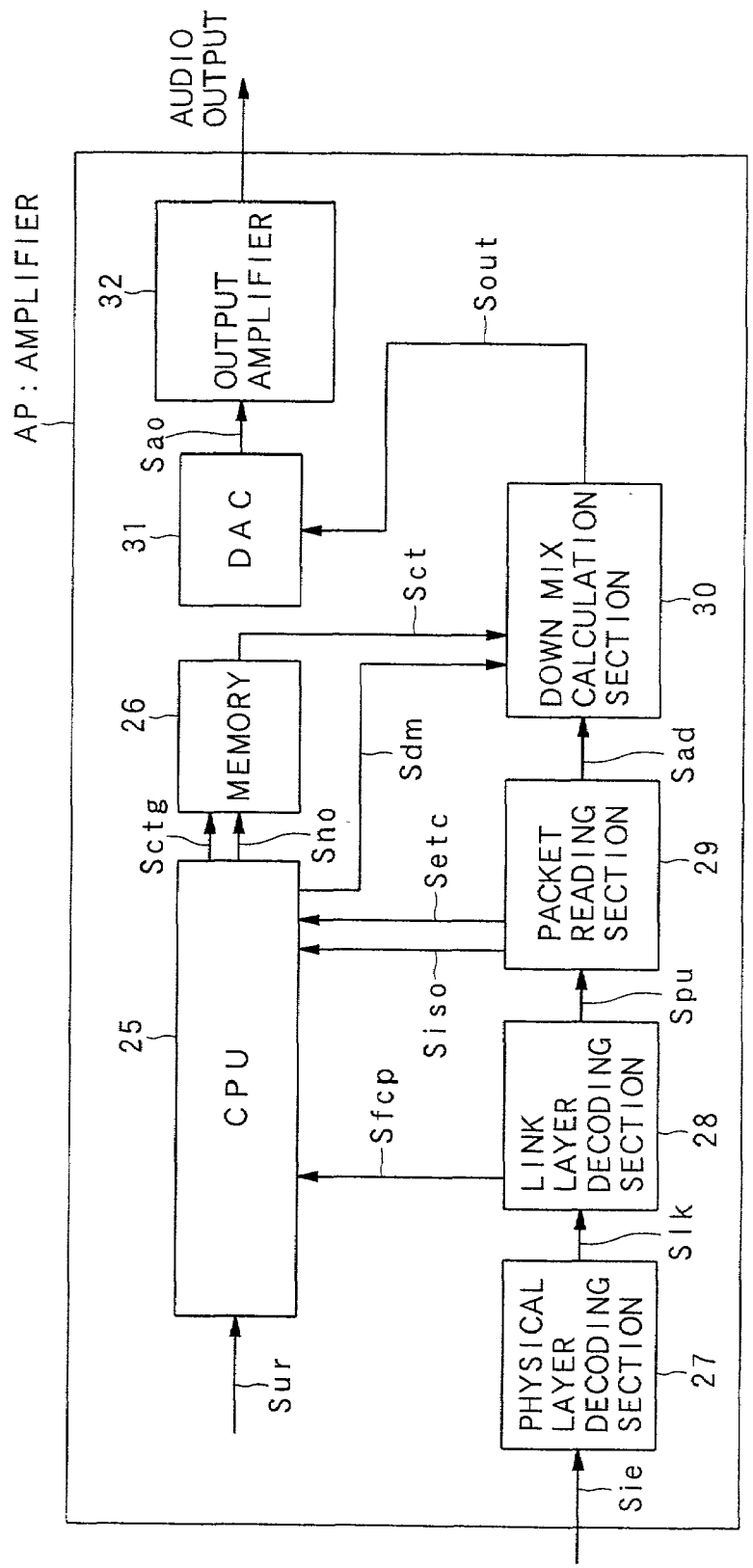
FIG. 9 is a block diagram showing an outline constitution of an amplifier of the first embodiment of the present invention.
Figure 10:
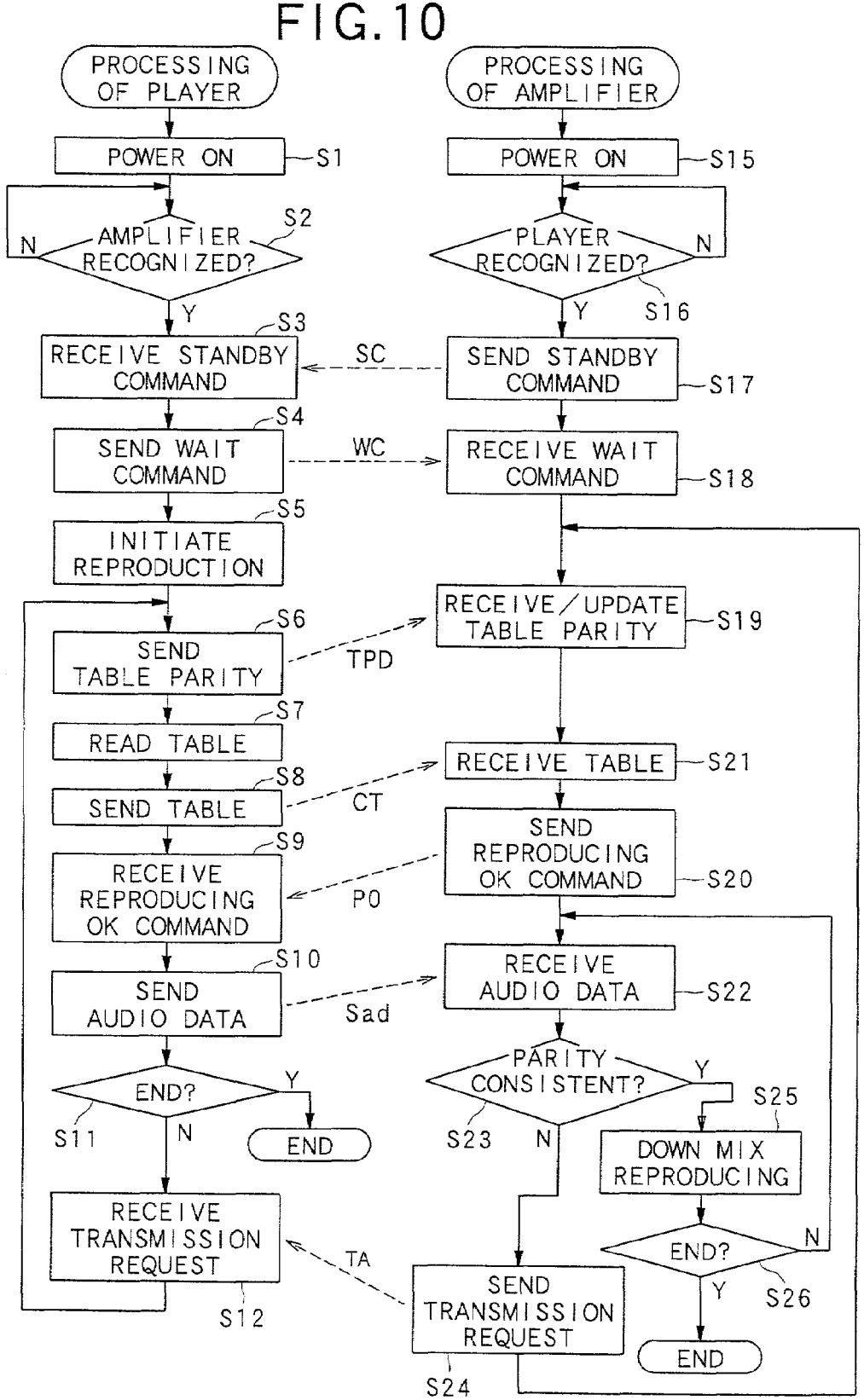
FIG. 10 is a flowchart showing a transmission processing of a synthesis coefficient table and the like of the first embodiment of the present invention.

FIG. 5 and FIG. 6 are block diagrams showing the DVD player DV, respectively, FIG. 7 and FIG. 8 are diagrams showing concrete constitutions of an isochronous packet IP of the first embodiment of the present invention, FIG. 9 is a block diagram showing a constitution of the amplifier AP, FIG. 10 is a flowchart showing a transmission processing of audio information and synthesis coefficient table and the like of the first embodiment of the present invention, and FIG. 11 is a diagram showing a concrete constitution of a data block transmitted by the transmission processing.

First, a constitution of a DVD player DV of the first embodiment of the present invention will be described below with reference to FIG. 5 and FIG. 6.

As shown in FIG. 5, the DVD player DV of the first embodiment of the present invention is consisted of a spindle motor 2, a pickup 3 as a detection device, a head amplifier 4, a servo controller 5, an A/D (Analog/Digital) converter 6, RF (Radio Frequency) decoder 7, a data decoder 8, RAMs (Random Access Memories) 9 and 11, a CPU 10 as a generation device, an input section 12 and a packetized section 13 as an output device.

The data decoder 8 is consisted of a demultiplexer 81, a video decoder 82, a sub-picture decoder 83, a mixer 84, an encoder 85, D/A (Digital/Analog) converters 86 and 88, an audio decoder 87 and a memory controller 89.

The packetized section 13 is consisted of, as shown in FIG. 6, a label addition section 20, a RAM 21, a parallel/serial conversion section 22, a link layer formation section 23 and a physical layer formation section 24.

Next, the outline of an operation will be described below.

The spindle motor 2 rotates the DVD audio disk 200 mounted on the turn table (not shown) at a predetermined linear velocity on the basis of a spindle control signal Sspd described later outputted from the servo controller 5.

At this moment, the pickup 3 receives a reflected light from the information recording surface of the DVD audio disk 200 of the light beam B and outputs a detection signal corresponding to a quantity of light of the reflected light to the head amplifier 4 as well as irradiates an light beam B such as laser light for use in information reproducing on the DVD audio disk 200.

Owing to this, the head amplifier 4 carries out a previously set amplification processing and the like to the above described detection signal outputted from the pickup 3, generates a focus error signal Sfe indicating the deviation of the focus position of the light beam B in the vertical direction to the above described information recording surface and a tracking error signal Ste indicating the deviation of the focus position in a parallel direction to the information recording surface, outputs them to the servo controller 5. The head amplifier 4 also generates an RF signal Srf including diffraction light component of the light beam B obtained by the light beam B being diffracted by pit string formed on the DVD audio disk 200 corresponding to the recorded recording information and outputs it to the A/D converter 6.

Then, the servo controller 5 forms a servo loop for controlling tracking servo and focus servo corresponding to a servo control signal Ssyc from the CPU 10, generates a focus actuator drive signal Sfd based on a focus error signal Sfe outputted from the head amplifier 4 and outputs it to a focus actuator (not shown) of the pickup 3. The servo controller 5 also generates a tracking actuator drive signal Std based on a tracking error signal Ste and outputs it to a tracking actuator (not shown) of the pickup 3.

In addition to these, the servo controller 5 detects a frequency difference and a phase difference between a synchronous signal Ssync outputted from the RF decoder 7 having a cycle synthesized with a rotational cycle of the DVD audio disk 200 and outputted from the RF decoder 7 and the reference signal (not shown), generates the above described spindle control signal Sspd based on the frequency difference and phase difference, and outputs it to the spindle motor 2.

By the operation of the servo controller 5, the light beam B is controlled so as to precisely move on the above described pit string while the light beam B focuses on an information recording surface of the DVD audio disk 200 rotated at a predetermined linear velocity corresponding to the above described reference signal.

On the other hand, a RF signal Srf outputted from the head amplifier 4 to the A/D converter 6 is digitalized by the A/D converter 6, converted into a digital RF signal Srfd, and outputted to the RF decoder 7.

Then, the RF decoder 7 extracts the above described synchronous signal Ssync from the outputted digital RF signal Srfd and outputs it to the servo controller 5. The RF decoder 7 also decodes a digital RF signal Srfd into a recording information data stream Sdst having a data structure shown in FIG. 1 including a video stream, an audio stream, and sub picture stream by performing demodulation processing on the basis of recording modulation method such as for example, 8/16 modulation and error correction processing with regard to the recording information recorded in the DVD audio disk 200, and outputs it to the data decoder 8.

In addition to these, the RF decoder 7 extracts output control data included in the above described private header 242 from the decoded recording information data stream Sdst, and the synthesis coefficient table CT from the ATSI 211. Then, the RF decoder 7 outputs them as an output control signal Sfk to the CPU 10.

The data decoder 8 extracts a video stream (mainly, a video stream detected from the video zone 200" shown in FIG. 1), an audio stream (mainly, an audio stream detected from the audio zone 200' shown in FIG. 1), and sub picture stream from the recording information data stream Sdst outputted from the RF decoder 7, respectively, decodes these on the basis of a predetermined encoding method defined per each stream, respectively, and generates video data, audio data Sad and sub picture data, respectively. The data decoder 8 performs the above-mentioned processing under the control of the CPU 10.

In addition, the packetized section 13 packetizes additional data Sap which is outputted from the CPU 10 and the above described audio data Sad so as to be in conformity with the above described serial bus standard. The additional data Sap includes necessary additional information in order to form an isochronous packet IP which should be included in the above described output control signal Sfk and a transmission signal Sie described later. Then, the packetized section 13 generates the above described isochronous packet IP and outputs it as a transmission signal Sie via the IEEE 1394 interface (not shown) onto the serial bus B. The packetized section 13 performs the above-mentioned processing based on a control signal Sc outputted from the CPU 10.

The detail operation of the data decoder 8 will be described below with reference to FIG. 5.

First, the demultiplexer 81 extracts a video stream Svst, an audio stream Sast and a sub picture stream Ssst from the recording information data stream Sdst outputted from the RF decoder 7, respectively, distributes the video stream Svst to the video decoder 82, the audio stream Sast to the audio decoder 87, and further the sub picture stream Ssst to the sub picture decoder 83 via data bus 80, the memory controller 89 and the RAM 9, respectively.

The audio decoder 87 performs decoding processing of one audio stream Sast out of audio stream Sast which is outputted from the demultiplexer 81 and consists of 8 streams at the maximum, generates audio data Sad, and outputs it to the D/A converter 88 and the packetized section 13, on the basis of a decode control signal Sdas with respect to the audio stream outputted from the CPU 10. Concretely, the decode control signal Sdas includes stream number and encoding method code and the like.

In the first embodiment of the present invention, description will be performed below on the premise that the reproduced audio stream Sast includes audio data of six channels for use in surround reproducing while the audio data is changed over per each sampling clock of certain cycle, however, at this moment, the audio decoder 87 generates a clock signal Ssc which is synchronized with the sampling clock, and outputs it to the CPU 10.

On the other hand, the video decoder 82 carries out decoding processing of a video stream Svst outputted from the demultiplexer 81, generates video data Svd, and outputs it to the mixer 84, on the basis of a decode control signal Sdvs with respect to a video stream Svst outputted from the CPU 10. Concretely, the decode control signal Sdvs includes encoding method code and the like.

The sub picture decoder 83 carries out decoding processing of a sub picture stream Ssst outputted from the demultiplexer 81, generates sub picture data Ssd and outputs it to the mixer 84, on the basis of a decode control signal Sdss with respect to a sub picture stream Ssst outputted from the CPU 10. Concretely, the decode control signal Sdss includes stream number and encoding method code and the like.

Owing to these, the mixer 84 synthesizes video data Svd and sub picture data Ssd on the basis of superimposed control signal Srrxc outputted from the CPU 10. At this moment, in the case where a superimposed control signal Smxc of H level is outputted from the CPU 10, the mixer 84 outputs data superimposing sub picture data Ssd on video data Svd as super imposed video data Smxv to the encoder 85. In the case where a superimposed control signal Smxc of L level is outputted from the CPU 10, the mixer 84 outputs video data Svd as superimposed video data Smxv to the encoder 85 without superimposing the sub picture data Ssd on the video data Svd.

Then, the encoder 85 encodes the superimposed video data Smxv outputted to video format data in conformity with a predetermined television method and outputs it to the D/A converter 86.

Owing to this, the D/A converter 86 converts the outputted video format data into an analog signal and outputs it to the external monitor (not shown) and the like.

Moreover, corresponding to the above described operation, the CPU 10 outputs the above described servo control signal Ssyc to the servo controller 5 in order to control the servo controller 5 in response to the operational instruction outputted from the input section 12 operated by the user. The CPU 10 also generates the above described each of decode control signals Sdas, Sdvs and Sdss and a superimposed control signal Smxc in order to control the above described decode processing of each decoder in the data decoder 8, outputs them to the decoder 8, and further, mainly carries out an operational control concerning with information reproducing operation of the entire DVD player DV. It should be noted that processing by the CPU 10 is carried out while outputting and receiving data with the RAM 11.

Next, the detailed operation of the packetized section 13 and the operation of the CPU 10 related to the detailed operation will be described below.

As described above, although the packetized section 13 constitutes an isochronous packet IP by employing information included in the above described audio data Sad and the above described additional data Sap, the packetized operation is carried out by the CPU 10 controlling in synchronization with the above described sampling clock included in a clock signal Ssc outputted from the audio decoder 87.

Specifically, as the CPU 10 detects a rise of sampling clock in a clock signal Ssc, first, writes IC header IPH (see FIG. 4) of 32 bits as additional data Sap in the RAM 21, and further, writes an error correction code for error correcting the contents of the IC header IPH in the RAM 21 of 32 bits. It should be noted that in FIG. 7 as described later, the IC header IPH itself and the error correction code are merged into an IC header IPH.

Next, the CPU 10 writes a CIP header CIPH of 64 bits (see FIG. 4) as additional data Sap in the RAM 21.

At this moment, the writing to the RAM 21 is carried out while additional data Sap is outputted onto a data bus (not shown) connecting between the RAM 21 and the CPU 10 and similarly while the address on an address bus (not shown) connecting between the RAM 21 and the CPU 10 is incremented on a byte-by-byte basis.

In parallel with this, the label addition section 20 generates a label of 8 bits described later per each channel corresponding to audio data Sad to be inputted, and writes the generated label and the audio data Sad in the RAM 21 as label addition data Sb1. At this moment, the length of data per one channel is 32 bits, of which the label occupies 8 bits portion and the audio data Sad occupies 24 bits.

Next, the CPU 10 writes output control data included in an output control signal Sfk outputted from the RF decoder 7 in the RAM 21 as additional data Sap.

Then, the writing of label additional data Sb1 to the RAM 21 by the above described label addition section 20 and the writing of additional data Sap to the RAM 21 by the CPU 10 are repeated for different audio data Sad solely in the number of times previously set (hereinafter, the number of times is defined as n).

The repeated number n is previously set on the basis of a sampling frequency of audio data 243 (Sad) to be packetized, the number of quantization bits and a transmission bit rate of an interface and the like in the serial bus standard. Concretely, for example, the value of n is defined as "16".

Next, when the writing of the label additional data Sb1 and the additional data Sap to the RAM 21 is entirely completed, finally, error correction code data CRC of 32 bits for correcting errors of the entire data in an isochronous packet IP is written in the RAM 21.

Owing to the above described operations, all of the data that should constitute one isochronous packet IP is written on the RAM 21.

Then, when the writing of each data is completed, the RAM 21 outputs the each data as a memory signal Smr which is parallel data to the parallel/serial conversion section 22.

Owing to this, the parallel/serial conversion section 22 converts the contents of the memory signal Smr to serial data and outputs it as a serial memory signal Ssr to the link layer formation section 23.

Then the link layer formation section 23 forms a link layer as an isochronous packet IP by employing data included in the serial memory signal Ssr in conformity with the serial bus standard, generates a link signal Slk and outputs it to the physical layer formation section 24.

Finally, the physical layer formation section 24 forms a physical layer as an isochronous packet IP by employing data included in a link signal Slk in conformity with the serial bus standard, ultimately generates the isochronous packet IP, forms a transmission signal Sie and outputs it to the amplifier AP described later via the IEEE 1394 interface and the serial bus B (not shown).

Next, a concrete constitution of an isochronous packet IP outputted as a transmission signal Sie from the packetized section 13 will be described below while exemplifying FIG. 7 and FIG. 8. It should be noted that in FIG. 7 and FIG. 8, for the purpose of making an explanation easier, the width of a string in the isochronous packet IP is defined as 4 bytes (32 bits).

As shown in FIG. 7, one isochronous packet IP has a constitution of 32 bits×(4+n×8+1) strings as a whole.

Four strings from the top are occupied by the above described IC header ICH and CIP header CIPH.

A data block DB is included per each unit of 8 strings respectively in the isochronous packet IP after the four strings from the tops.

In the respective data block DB, as described later, information such as audio data Sad which should be treated by down mix processing in a different mode per each embodiment in the first to third embodiments of the present invention and a synthesis coefficient table employed for the down mix processing and the like are included.

Then, the rear tail end of one isochronous packet IP, the above described error correction data CRC of 32 bits for correcting errors of the entire data is added within the isochronous packet IP, and one isochronous packet IP is finally constituted by the respective data described above.

Concretely, as the above described CIP header CIPH, as shown in FIG. 8, it includes at least, a node identifier (source ID) SID for identifying a node to which an isochronous packet IP including the CIP header CIPH is sent out, the number of a data block DBS indicating the number of data blocks included within data region DF, sequence information (Data Block Counter) DBC which is given serially in a sending out sequence to data within a plurality of data regions DF sent out from one node, a data identifier (Format ID; having the contents indicating audio data Sad in the case of the first embodiment of the present invention) FMT indicating a kind of data included within data region DF, related information (Format Dependent Field) FDF which are data related to types of data indicated by data indentifier FMT and a processing time information SYT which indicates a time of initiating a processing corresponding to data included within data region DF after having received in a node receiving the data. The related information FDF includes a sampling frequency of audio data Sad included in the isochronous packet IP, a format of each following data included in the isochronous packet IP, etc. The format of each following data is a data format having a label of 8 bits and a concrete data of 24 bits.

As described above, data of one information unit corresponding to one sample timing in audio data Sad to be transmitted is consisted of a data block DB per 8 strings shown in FIG. 7, however, since data of n pieces of the information units corresponding to n pieces of sampling timings is incorporated in one isochronous packet IP, as a result, n sets in the total of data block DB per 8 strings are arrayed in one isochronous packet IP.

It should be noted that in a constitution of an isochronous packet IP shown in FIG. 7, the fifth string to the (4+n×8+1)th string correspond to the data region DF shown in FIG. 4.

Next, a constitution of the amplifier AP of the first embodiment of the present invention will be described below with reference to FIG. 9.

As shown in FIG. 9, the amplifier AP of the first embodiment of the present invention is consisted of a CPU 25, a memory 26, a physical layer decoding section 27, a link layer decoding section 28 as an extracting device, a packet reading section 29 as an acquisition device, a down mix calculation section 30 as a reproducing device, a D/A converter 31 and an output amplifier 32.

Next, an outline of operations will be described below.

First, the physical layer decoding section 27 receives a transmission signal Sie transmitted from the DVD player DV via the serial bus B, decodes the contents of a physical layer of each isochronous packet IP, which is included in the transmission signal Sie, in conformity with the serial bus standard, generates the above described link signal Slk and outputs it to the link layer decoding section 28.

The link layer decoding section 28 decodes the contents of a link layer of each isochronous packet IP, which is included in a link signal Slk in conformity with the serial bus standard, generates a link decoding signal Spu, and outputs it to the packet reading section 9.

Then, the packet reading section 9 resolves packetizing of each isochronous packet IP included in a link decoding signal Spu and reads the contents. The packet reading section 9 also outputs various kinds of information required in down mix processing except the above described synthesis coefficient as down mix information signal Setc to the CPU 25 and outputs the above described read audio data Sad to the down mix calculation section 30.

In parallel with this, in the first embodiment, the second embodiment and the third embodiment of the present invention described later, a plurality of synthesis coefficient tables and table parity data (hereinafter, solely referred to TP data) as corresponding data are outputted as a table signal Siso from the packet reading section 29 to the CPU 25. The synthesis coefficient tables includes a plurality of sets of the above synthesis coefficients and are included in a transmission signal Sie. The table parity data indicates the relationship between respective synthesis coefficient table and audio data Sad to be treated by down mix processing by employing the respective synthesis coefficient table.

Moreover, in the fourth to sixth embodiments of the present invention described later, the above described respective synthesis coefficient table and TP data are outputted as a table signal Sfcp from the link layer decoding section 28 to the CPU 25.

Owing to these, the CPU 25 stores the respective synthesis coefficient table itself inputted as a table signal Siso or Sfcp in the memory 26 as a table signal Sctg.

Then, if an instruction signal Sur indicating to be treated by down mix processing in the amplifier AP is inputted from the operational section (not shown), on the basis of the signal Sur, a control signal Sdm for controlling the initiation of down mix processing in the down mix calculation section 30 is outputted to the down mix calculation section 30, and a table number information Sno indicating a synthesis coefficient table actually employed in down mix processing out of synthesis coefficients memorized in the memory 26 is outputted to the memory 26.

Owing to this, the memory 26 extracts the synthesis coefficient table corresponding to the number indicated by the table number information Sno from the respective memorized synthesis coefficient table and outputs it as a synthesis coefficient signal Sct to the down mix calculation section 30.

Then, when the down mix calculation section 30 is directed via the CPU 25 with a control signal Sdm from the user that the down mix processing should be carried out to audio data Sad, the down mix calculation section 30 carries out the down mix processing to the audio data Sad by employing a synthesis coefficient inputted as the above described synthesis coefficient signal Sct, generates an output signal Sout including audio data Sad which has been down-mixed to two channels, and outputs it to the D/A converter 31.

On the other hand, in the case where an instruction by which the down mix processing should be carry out is not indicated, the inputted audio data Sad is outputted as an output signal Sout as it is to the D/A converter 31.

Owing to this, the D/A (digital to analog) converter 31 converts the inputted output signal Sout into an analog output signal Sao and outputs it to the output amplifier 32.

Finally, the output amplifier 32 carries out the previously set processes such as amplification and the like to the audio data Sad per each channel included in the analog output signal Sao and outputs it as an audio output to the speaker (not shown) or the like.

Next, a transmission processing of the audio data Sad, the synthesis coefficient table, etc. in the first embodiment of the present invention carried out between the DVD player DV having the above described constitution and the amplifier AP will be described below with reference to FIG. 10 and FIG. 11.

It should be noted that FIG. 10 is a flowchart showing the transmission processing and FIGS. 11A to 11C are diagrams showing data blocks respectively formed in a DVD player DV in processing of the first embodiment of the present invention.

As shown in FIG. 10, in a transmission processing such as audio data Sad and a synthesis coefficient table of the first embodiment of the present invention, first, in the DVD player DV and the amplifier AP, respectively, turning the power on (Steps S1 and S15) and reciprocal recognition (Steps S2 and S16) are carried out. At this moment, the transmission and receipt of the information required for reciprocal recognition are carried out by employing a data packet DP or an acknowledge packet ACP in the above described asynchronous transmission region ACT.

Then, when the recognition cannot be performed each other (Step S2; N and Step S16; N), the recognition processing is repeated until the recognition can be performed. When the recognition can be performed (Step S2; Y and Step S16; Y), a reproducing preparation completion command (standby command) SC, which represents the effect that receipt of a synthesis coefficient table via a serial bus B in the amplifier AP is possible and transmission of the synthesis coefficient table is promoted, is stored in the above described data packet DP in the asynchronous region ACT, and is sent out from the amplifier AP to the DVD player DV (Step S17).

When the DVD player DV receives the reproducing preparation completion command SC (Step S3), it stores wait command WC in the above described data packet DP and outputs it to the amplifier AP (Step S4). The wait command WC is a command for having the amplifier AP wait until the synthesis coefficient table is reproduced from the DVD audio disk 200, corresponding to the reproducing preparation completion command SC. When the amplifier AP receives the wait command WC (Step S18), it waits until the above described synthesis coefficient table CT is received.

Then, in the DVD player DV, processing of reproducing of the audio data Sad and the like outputted from the DVD audio disk 200 are initiated (Step S5). The DVD player DV defines TP data TPD as data "1", stores it in the above described data block DB in the isochronous packet IP, and transmits it to the amplifier AP (Step S6). The TP data TPD indicates the following down coefficient table CT out of the above described TP data indicating the relationship with the synthesis coefficient table transmitted later and audio data Sad to which the down mix processing should be carried out by employing the synthesis coefficient table. On the other hand, TP data TPD is also set and memorized in the amplifier AP. The value of TP data TPD memorized in the amplifier AP is defined as "0" immediately after the appliance is switched on. When the amplifier AP receives the TP data TPD from the DVD player DV, it updates the value of the memorized TP data TPD to "1" (Step S19). It should be noted that TD data TPD transmitted at this moment is transmitted in order to make the amplifier AP recognize TP data set in the amplifier AP will change from then.

A concrete constitution of a data block DB0 including the transmitted TP data TPD will be described with reference to FIG. 11A. In the strings from the first string to the sixth string, the first 8 bits are respectively occupied by any one of labels LB1 to LB6 indicating that all of the following data in the respective strings is zero ("0") data. Then, the rest of bits in the respective strings are occupied by zero data ZR (24 bits, respectively).

Furthermore, in the seventh string, the first 8 bits are occupied by label LB7 indicating attribute of the following respective data in the seventh string. Then, the rest of bits in the seventh string are occupied by the first output control data (24 bits) which is output control data to be stored in all of the isochronous packet IP out of the above output control data and transmitted.

The label LB7 has a value of 8 bits which is different from those of the above described labels LB1 to LB6 and indicates that the following data of 24 bits is the above described first output control data.

Concretely, the first output control data includes: an address data AR (e.g., having "00000001" as a value of 8 bits) indicating that the following data is the first output control data; a dynamic range control data DRC (8 bits) for controlling a dynamic range during reproducing of audio data Sad after transmission; a down mix code data DMC (4 bits) indicating the number of synthesis coefficient table employed for down mix processing; an emphasis flag EF (1 bit) indicating whether or not so called emphasis processing is carried out to audio data Sad; a down mix mode data DMM (1 bit) indicating whether or not audio information allows to be down mixed during the reproducing; a down mix code identifier data DMCV (1 bit) indicating whether or not the above described down mix code data DMC actually has a value; and a reserved data RD (1 bit) are included.

In the eighth string, the first 8 bits are occupied by label LB8 indicating attribute of the following respective data in the eighth string. Then, the rest of bits are occupied by the second output control data (24 bits) which is output control data to be stored in the isochronous packet IP and transmitted only when a change of sampling frequency out of the above described output control data and the like are required during reproducing after transmission.

The label LB8 has a value of 8 bits which is different from those of the labels LB1 to LB7, and indicates that the following data of 24 bits is not the above described first output control data, nor are audio data AD1 to AD6.

Concretely, the second output control data includes an address data AR (e.g., having "00000011" as a value of 8 bits), the above described TP data TPD (1 bit) and a zero data ZR (7 bits).

When sending and receiving TP data TPD are completed, the above described synthesis coefficient table CT included in the above described ATSI 211 in the DVD audio disk 200 in the DVD player DV is read from the DVD audio disk 200 (Step S7). Then, after TP data TPD (its value is "1") indicating the read synthesis coefficient table CT is stored in a data block DB of a mode showing in FIG. 11A, transmitted again, and stored in the amplifier AP temporarily. After that, the synthesis coefficient table CT is stored in a data block DB, transmitted to the amplifier AP (Step S8) and received in the amplifier AP (Step S20).

A concrete constitution of a data block DB1 including the synthesis coefficient table CT will be described with reference to FIG. 11B. As shown in FIG. 11B, the strings from the first string to the seventh string respectively have constitution similar to the data block DB in the case of the above described TP data TPD are included. In the eighth string, the first 8 bits are occupied by the label LB8. Then, the rest of bits in the eighth string are occupied by an address data AR (e.g., having "00000100" as a value of 8 bits) indicating that the following data is a synthesis coefficient table CT and the synthesis coefficient table CT (16 bits).

It should be noted that since a data amount of data transmitted as one synthesis coefficient table CT is standardized that it includes a plurality of synthesis coefficient table CT portions and has total 288 bytes, the processes of Steps S8 and S20 are repeated until data block DB shown in FIG. 11B is transmitted 144 times (288 bytes/16 bits).

Then, when all of synthesis coefficient table CT is received in the amplifier AP, reproducing OK command PO representing the effect that reproducing initiation preparation with down mix processing employing the received synthesis coefficient table CT is completed is outputted to the DVD player DV (Step S21), which is received in the DVD player DV (Step S9). After that, data block DB including audio data Sad itself to be processed by down mix processing and TP data TPA indicating the audio data Sad is formed and transmitted to the amplifier AP (Step S1). Then, the data block DB is received in the amplifier AP (Step S22). The TP data TPA is stored in the same data block DB with the audio data Sad and transmitted.

A concrete constitution of a data block DB2 including the transmitted audio data Sad and TP data TPA will be described with reference to FIG. 11C. In the strings from the first string to the sixth string, the first 8 bits are respectively occupied by any one of the labels LB1 to LB6. Then, the rest of bits in the respective strings are occupied by audio data AD1 to AD6 (24 bits, respectively) which are actual audio data Sad (audio sampling information). The audio data AD1 to AD6 corresponds to the actual audio data Sad of the channels from the first channel to sixth channel respectively. The labels LB1 to LB6 includes information indicating attribute of the following respective audio data AD1 to AD6. Concretely, the attribute includes the number of channel, etc.

Moreover, the seventh string has constitution similar to that of data block DB (see FIG. 11A) in the case of including TP data TPD described above. In the eighth string, the first 8 bits are occupied by label LB8 indicating attribute of the following data in the eighth string. Then, the rest of bits are occupied by the above described second output control data (24 bits).

Concretely, the second output control data includes: an address data AR (e.g., having "00000010" as a value of 8 bits) indicating that the following data is the second output control data; a sampling frequency data FS2 (4 bits) for designating sampling frequency during reproducing after transmission of a channel group (e.g., channel group employed for rear reproducing) previously set in surround reproducing; a channel format data MCT (4 bits) indicating a channel format in audio data Sad; a channel allocation data CA (5 bits) indicating a channel allocation (a channel allocation in respective audio data Sad) during reproducing after transmission; TP data TPA (1 bit; its value is made "1") indicating audio data Sad stored in the same data block DB and at the same time transmitted; and a reserved data RD (2 bits).

Then, the DVD player DV recognizes whether or not all of the required audio data Sad has been completely sent out (Step S11), in the case of being completed (Step S11; Y), reproducing processing is completed. On the other hand, in the case of not being completed (Step S11; N), the processing returns to Step S6 via Step S12, processes of Steps S6 to S12 described above are repeated until all of the transmission of audio data Sad is completed.

On the other hand, in the amplifier AP received TP data TPA and audio data Sad as well, the value of TP data TPA received at Step S22 and the value of TP data TPD transmitted with a synthesis coefficient table CT at Step S20 are compared (Step S23). If it is consistent with each other (Step S23; Y), it is determined that the synthesis coefficient table CT and the audio data Sap received in respective processes are in a corresponding relationship. Then, the audio data Sap is reproduced by down mix processing employing the synthesis coefficient CT in the down mix calculation section 30 (Step S25). After that, it is determined whether or not reproducing of all of the audio data Sad is completed (Step S26). If it is completed (Step S26; Y), the processing is terminated. If it is not completed (Step S26; N), the process is forced to return to Step S22 and the processes of the above described Steps S22 and S26 are repeated until the reproducing is completed.

On the other hand, in the determination of Step S23, if the value of TP data TPA and the value of TP data TPD received at Steps S22 and S8, respectively are not consistent with each other (Step S23; N), it is determined that the synthesis coefficient table CT and the audio data Sap received are not in a corresponding relationship. After a transmission request command TA which requires a transmission of a new synthesis coefficient table CT is sent out to the DVD player DV (Step S24), the process transfers to Step S19, and waits until the new synthesis coefficient table CT is transmitted.

Owing to this, if the DVD player DV has received the transmission request command TA (Step S12), the process is forced to return to Step S6 and the transmission of the new TP data TPD and the reading of the new synthesis coefficient table CT are carried out. Then, the processing of Steps S8 to S12 described above is repeated after that time.

It should be noted that in a transmission processing of the first embodiment of the present invention, it is not necessarily that data block DB0 or DB2 shown in FIG. 11 respectively is included in one isochronous packet IC. A data block DB which includes the other data between respective data blocks can be transmitted.

The processing in the CPU 25 has been preset so that the CPU 25 unconditionally recognized that the synthesis coefficient table CT included in the data block DB1 corresponds to the TP data TPD transmitted by the data block DB0 when a data block DB1 of a form shown in FIG. 11B is transmitted in the first place after a data block DB0 shown in FIG. 11A is transmitted in the amplifier AP. The processing also has been preset so that the CPU 25 unconditionally recognized that TP data TPA (TP data TPA corresponding to audio data Sad transmitted simultaneously) included in the data block DB2 corresponds to the synthesis coefficient table CT transmitted by the data block DB1 when a data block DB2 of a form shown in FIG. 11C is transmitted in the first place after a data block DB1 shown in FIG. 11B is transmitted. That is why it is not necessarily that data block DB0 or DB2 shown in FIG. 11 respectively is included in one isochronous packet IC.

As described above, according to a transmission processing of audio data Sad and the like in the first embodiment of the present invention, since an isochronous packet IC including at least any one of audio data Sad, a synthesis coefficient table CT, TP data TPD or TPA is formed and outputted onto the serial bus B. Therefore, when the audio data Sad and the like are received by the amplifier AP, the down mix processing of the audio data Sad can be carried out by associating the synthesis coefficient table CT and the audio data Sad using TP data TPD or TPA. As a result, even the synthesis coefficient table CT has an amount of information (288 bytes) not capable of being included in one isochronous packet IC, the down mix processing of the audio data Sad can be carried out by precisely utilizing the synthesis coefficient table CT.

Moreover, since the synthesis coefficient table CT is stored in the isochronous packet IC and outputted onto the serial bus B, the synthesis coefficient table CT can be transmitted by a simple processing.

Furthermore, the synthesis coefficient table CT can be securely transmitted between the DVD player DV and the amplifier AP connected under the serial bus standard.

It should be noted that case in which the processes of Steps S3, S17, S4, S18, S9 and S21, out of transmission processes of the first embodiment of the present invention shown in FIG. 10, are required is only the case where the DVD player DV is controlled by the other personal computer PC connected on the serial bus B. In the case where the DVD player DV is controlled and down-mix-treated by the input section 12 in the DVD player DV (i.e., case where a transmission processing is carried out while the user grasps the proceeding situation of the DVD player DV and the proceeding situation of the processing), it will be good if the processes of the Steps S3, S17, S4, S18, S9 and S21 are carried out or not.

Moreover, If the above described second output control data is not transmitted, the eighth string of a constitution of a data block DB shown in FIG. 11 can be constituted so that for example, a given data such as letter data and the like is transmitted according to the setting that the value of an address data AR is made be a different value (e.g., "00000001") from that of the case where the second output control data is transmitted.

(III) Second Embodiment

Next, the second embodiment of the present invention will be described below with reference to FIG. 11 and FIG. 12.

Figure 12:
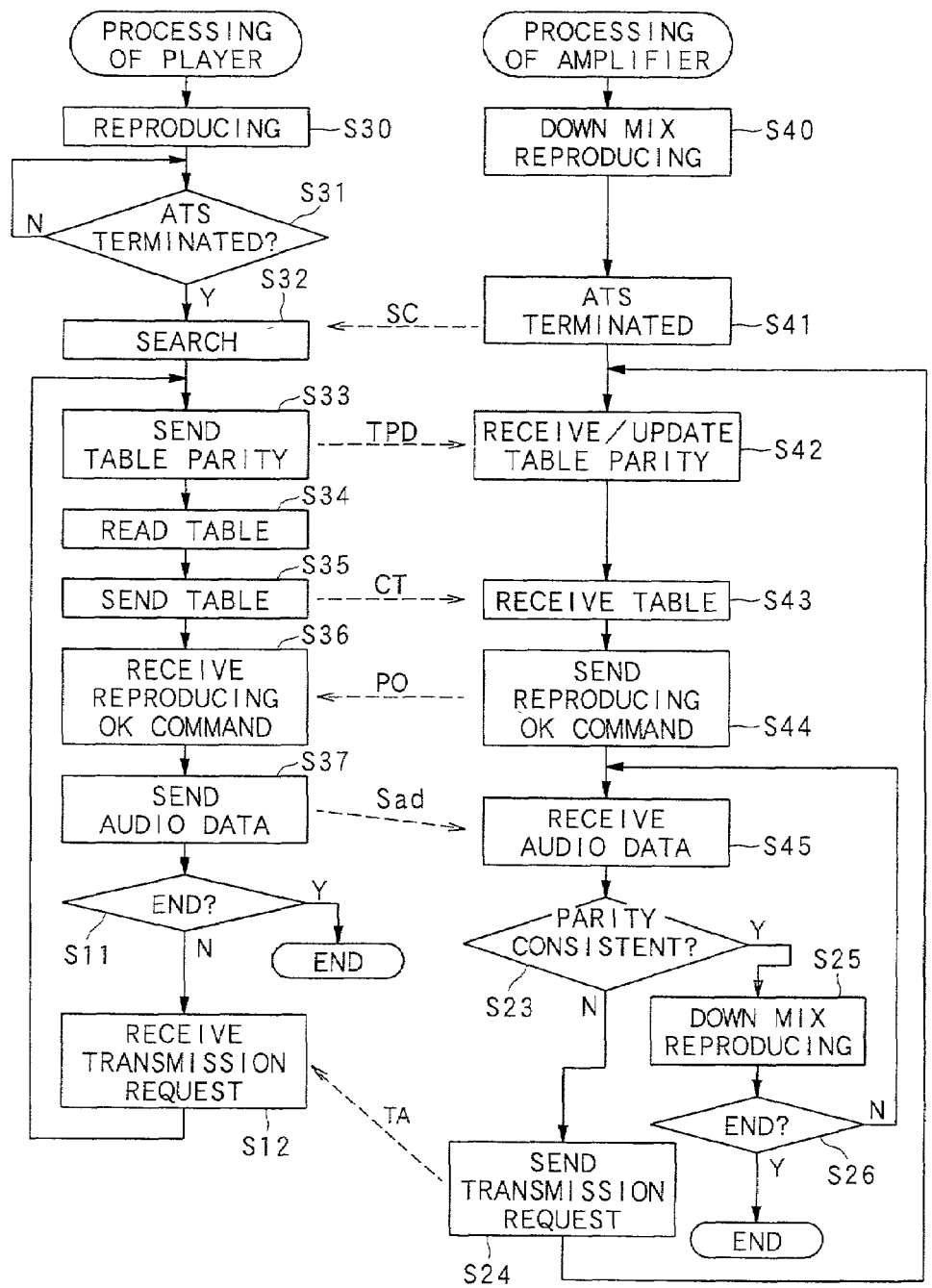
FIG. 12 is a flowchart showing a transmission processing of a synthesis coefficient table and the like of a second embodiment of the present invention.

It should be noted that FIG. 12 is a flowchart showing a transmission processing of audio data Sad, a synthesis coefficient table and the like of the second embodiment of the present invention.

In the above described first embodiment of the present invention, transmission of audio data Sad is initiated from the state where the electric source is switched off in both of the DVD player DV and the amplifier AP. However, in the second embodiment of the present invention, in consideration of the above described synthesis coefficient table CT changing per ATS 203, after reproducing of audio data Sad included in one ATS 203 accompanied with down mix processing is completed, the reproducing of audio data Sad accompanied with the update of the synthesis coefficient table CT is carried out when the process transfers to reproducing of audio data Sad in the next ATS 203.

It should be noted that in a processing of transmission shown in FIG. 12, as to the processing which is similar to that of the above described first embodiment of the present invention, similar step number is attached and its description in detail is omitted.

As shown in FIG. 12, in a transmission processing of audio data Sad of the second embodiment of the present invention, it is the premise that the down mix processing is continued in the DVD player DV and the amplifier Ap respectively by utilizing a synthesis coefficient table CT whose transmission is initiated by a transmission processing of the first embodiment of the present invention (Steps S30 and S40).

Then, during the reproducing, whether the reproducing of audio data Sad included in one ATS 203 is entirely completed in the DVD player DV or not is always monitored (Step S31). And then, if the reproducing of audio data Sad included in the one AST 203 is not completed (Step S31; N), the reproducing accompanied with the down mix processing is continued in the mode of the first embodiment of the present invention until the reproducing is completed. On the other hand, if the reproducing is completed (Step S31; Y), the reproducing accompanied with the down mix processing in the amplifier AP is also completed (Step S41). Then, the top of the ATS 203 including audio data Sad to be reproduced next is retrieved (Step S32).

Then, if the ATS 203 to be reproduced can be retrieved, in order to invert TP data TPD set at present in the amplifier AP, a new TP data TPD is stored as a data "0" in a data block DB and transmitted to the amplifier (Step S33). In other words, the TP data TPD set in the amplifier AP is "1" if the second embodiment of the present invention is viewed as continued one from the first embodiment of the present invention. Then, in order to force the amplifier AP to recognize that a new synthesis coefficient table CT is going to be sent out from this time, the new TP data TPD is stored as a data "0" in the data block DB. Then, the transmitted new TP data TPD is received in the amplifier AP. The value of the TP data TPD ("1") previously set and memorized is updated to "0" (Step S42) as well.

A concrete constitution of a data block DB0 including the TP data TPD to be transmitted is the entirely similar to that shown in FIG. 11A.

When the sending and receiving of the new TP data TPD are completed, the above described synthesis coefficient table CT is read from the DVD audio disk 200 in the DVD player DV (Step S34). And then, after TP data TPD (it value is "0") indicating the read synthesis coefficient table CT is transmitted again by a mode shown in FIG. 11A and stored temporarily in the amplifier AP, the synthesis coefficient table CT is stored in the data block DB. Then, the synthesis coefficient table CT is transmitted to the amplifier AP (Step S35) and received in the amplifier AP (Step S43).

At this moment, a concrete constitution of a data block DB1 including the synthesis coefficient table CT is entirely similar to that shown in FIG. 11B.

Then, when synthesis coefficient tables CT are all received in the amplifier AP, a reproducing OK command PO which is similar to that of the first embodiment of the present invention is outputted to the DVD player DV (Step S44). After that, the reproducing OK command PO is received in the DVD player DV (Step S36). And then, forming the data block DB including audio data Sad to be submitted to the down mix processing, the data block DB is transmitted with the corresponding TP data TPA (its value is "0") to the amplifier AP (Step S37). They are received in the amplifier AP (Step S45).

A concrete constitution of the data block DB2 including the audio data Sad and TP data TPA to be transmitted, it is entirely similar to that shown in FIG. 11C.

Then, hereinafter, the processing similar to that of the above described first embodiment of the present invention is carried out in the DVD player DV (Steps S11 to S12) and in the amplifier AP (Steps S23 to S26), and the processes are terminated.

When the value of TP data TPD set and memorize in the amplifier AP by the time of transmission at Step S33 is "0", TP data TPD having value "1" is transmitted at Step S33 in the second embodiment of the present invention in order to invert it. On the other hand, when the value of TP data TPD set and memorize in the amplifier AP by the time of transmission at Step S33 is "1", TP data TPD having the value "0" is transmitted at Step S33 in order to invert it. And then, the value of TP data TPD transmitted in the following Step S35 and the value of TP data TPA transmitted at Step S37 is defined to the same as the value of TP data TPD transmitted in this Step S33.

According to a transmission processing of the second embodiment of the present invention, since at every time when the ATS 203 is changed, TP data TPD and TPA added to a synthesis coefficient table CT and audio data Sad are transmitted while the values of TP data TPD and TPA are reciprocally inverted between "0" and "1" without any numbers in between, even in the case where the reproducing with the down mix processing is continued when the ATS 203 is changed, an effect similar to the processing of the above described first embodiment of the present invention can be exerted.

(IV) Third Embodiment

Next, the third embodiment which is the other embodiment of the present invention will be described below with reference to FIG. 13 and FIG. 14.

Figure 13:
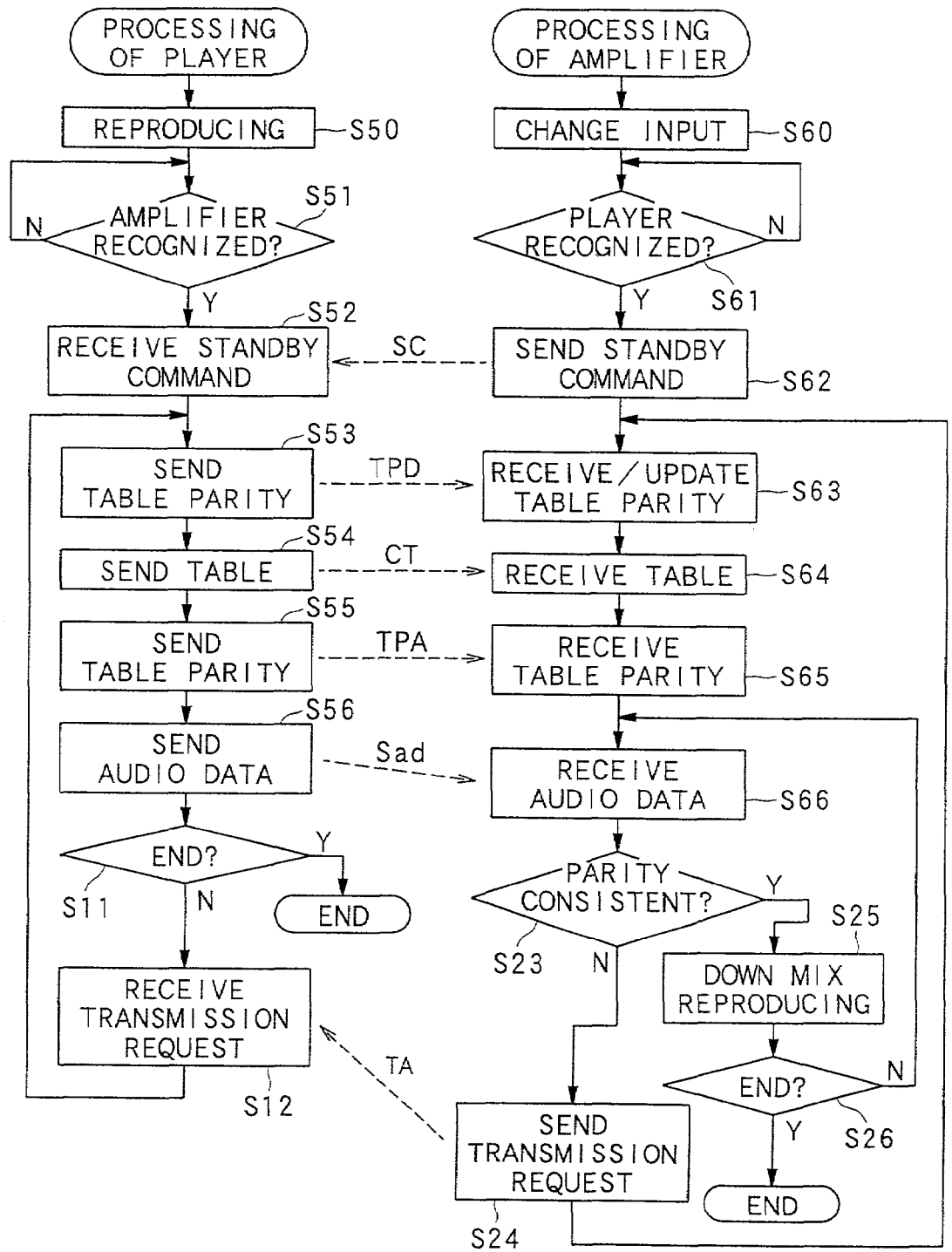
FIG. 13 is a flowchart showing a transmission processing of a synthesis coefficient table and the like of a third embodiment of the present invention.

It should be noted that FIG. 13 is a flowchart showing a transmission processing of audio data Sad of the third embodiment of the present invention and FIGS. 14A to 14C are diagrams respectively showing a data block DB formed in the DVD player DV in the processes of the third embodiment of the present invention.

In the above described first embodiment of the present invention, the transmission of audio data Sad is initiated from the state where the electric source is switched off in both of the DVD player DV and the amplifier AP. In the second embodiment of the present invention, the reproducing accompanied with the down mix processing immediately after the ATS 203 is changed in the reproducing of audio data Sad in the DVD player DV has been described. However, in the third embodiment of the present invention, in the case where the transmission of a synthesis coefficient table CT from the DVD player DV to the amplifier AP has already initiated, when the input selection in the other amplifier AP connected to the serial bus B is changed to the DVD player DV, or when a new other amplifier AP is connected to the serial bus B (i.e., the above described bus reset is occurred) and the like, the reproducing processing of audio data Sad accompanied with the down mix processing is initiated in the other amplifier AP.

It should be noted that in a transmission processing shown in FIG. 13, as to a processing similar to that in the first embodiment of the present invention described above, a similar step number is attached, and the description in detail is omitted.

As shown in FIG. 13, in a transmission processing of audio data Sad of the third embodiment of the present invention, the reproducing processing up to that time is continued in the DVD player DV (Step S50), and the above described input change is carried out in the other amplifier AP (Step S60). Further, the reciprocal recognitions (Steps S51 and S61) are carried out in the DVD player DV and the other amplifier AP accompanied with the input change. At this moment, the sending out and receiving of the information required for reciprocal recognition are carried out by employing the data packet DP and the acknowledge packet ACP in the above described asynchronous transmission region ACT.

Then, if they cannot recognize each other (Step S51; N and Step S61; N), the recognition processing is repeated until the respective can recognize each other. When the recognition can be achieved (Step S51; Y and Step S61; Y), a reproducing preparation completion command SC similar to that of the first embodiment of the present invention is stored in the above described data packet DP and transmitted from the other amplifier AP to the DVD player DV (Step S62).

Next, TP data TPD having the value ("0" or "1") used in the reproducing processing accompanied with the down mix processing which is continued (Step S50) is stored in the above described data block DB including audio data Sad which is reproduced at present. Then, the TP data TPD is transmitted from the DVD player DV which has received the reproducing preparation completion command SC (Step S52) to the other amplifier AP (Step S53). Then, TP data TPD is received in the other amplifier AP, and the value of TP data TPD which is initialized (set as "0" immediately after the input change) is updated to the value of the received TP data TPD (Step S63).

A concrete constitution of the data block DB0 including the TP data TPD to be transmitted will be described with reference to FIG. 14A, the constitution of the data block DB0' is entirely similar to that shown in FIG. 11(*a*) except that the first string to the sixth string are occupied by audio data AD1 to AD6 (24 bits, respectively) which are audio data Sad being reproduced and labels LB1 to LB6 (8 bits) as the top of them respectively.

When the sending out and receiving TP data TPD are completed, TP data TPD (its value is the same as the value transmitted at Step S53) indicating the synthesis coefficient table CT used at present is stored in the data block DB including audio data Sad which is reproduced at present in the mode shown in FIG. 14A. At this moment, the synthesis coefficient table CT has already read from the DVD audio disk 200 in the reproducing processing at Step S50 and memorized in the RAM 11 in the DVD player DV. Then, TP data TPD is transmitted from the DVD player DV to the other amplifier AP again and temporarily stored in the other amplifier AP. After that, the synthesis coefficient table CT used at present is stored in the data block DB and transmitted to the other amplifier AP (Step S54). Then, the synthesis coefficient table CT is received in the other amplifier AP (Step S64).

At this moment, a concrete constitution of a data block DB1' including the synthesis coefficient table CT, as shown in FIG. 14B, is entirely similar to that shown in FIG. 11B except that the first string to the sixth string are respectively occupied by audio data AD1 to AD6 (24 bits, respectively) which are audio data Sad being reproduced and labels LB1 to LB6 (8 bits, respectively) as the top of them.

Then, when synthesis coefficient tables CT are all received in the other amplifier AP, for the purpose of recognition, TP data TPD having the value used at present is stored in the above described data block DB including audio data Sad played back at present, and transmitted again to the other amplifier AP (Step S55), and which is received in the amplifier AP (Step S65).

Subsequently, the data block DB including the audio data Sad itself to be down-mix-treated, whose reproducing is continued at present, and the TD data TPA (its value is the same as the value of one transmitted at Steps S53 and S54) indicating the audio data Sad is formed, and transmitted to the other amplifier AP (Step S56). Then, the data block DB is received in the other amplifier AP (Step S66).

A concrete constitution of the data block DB2 including the audio data Sad and TP data TPA to be transmitted is, as shown in FIG. 14C, entirely similar to that shown in FIG. 11C.

Then, hereinafter, the processes similar to those of the above described first or the second embodiment of the present invention is carried out in the DVD player DV (Steps S11 to S12) and in the other amplifier AP (Steps S23 to S26), and the reproducing processing is terminated.

According to the transmission processing of the third embodiment of the present invention described above, in the case where the transmission of the synthesis coefficient table CT has already been initiated from the DVD player DV to the amplifier AP, even if the input selection change is performed or the connection of a new other amplifier AP is performed, an effect similar to the transmission processing of the above described first or the second embodiment of the present invention can be exerted.

(V) Fourth Embodiment

Next, the fourth embodiment of the present invention which is the other embodiment will be described below with reference to FIG. 15 and FIG. 16.

Figure 15:
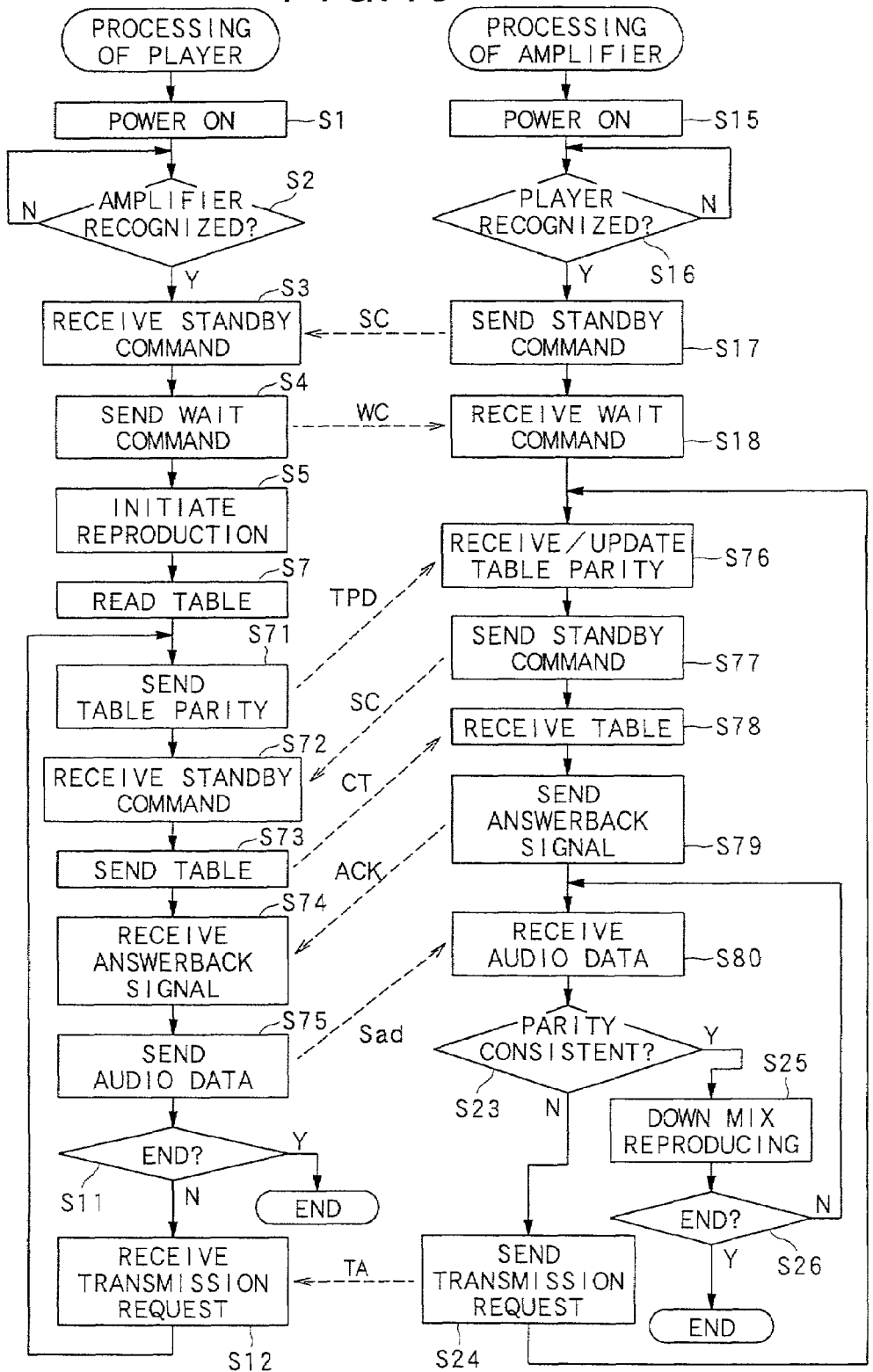
FIG. 15 is a flowchart showing a transmission processing of a synthesis coefficient table and the like of a fourth embodiment of the present invention.
Figure 16:
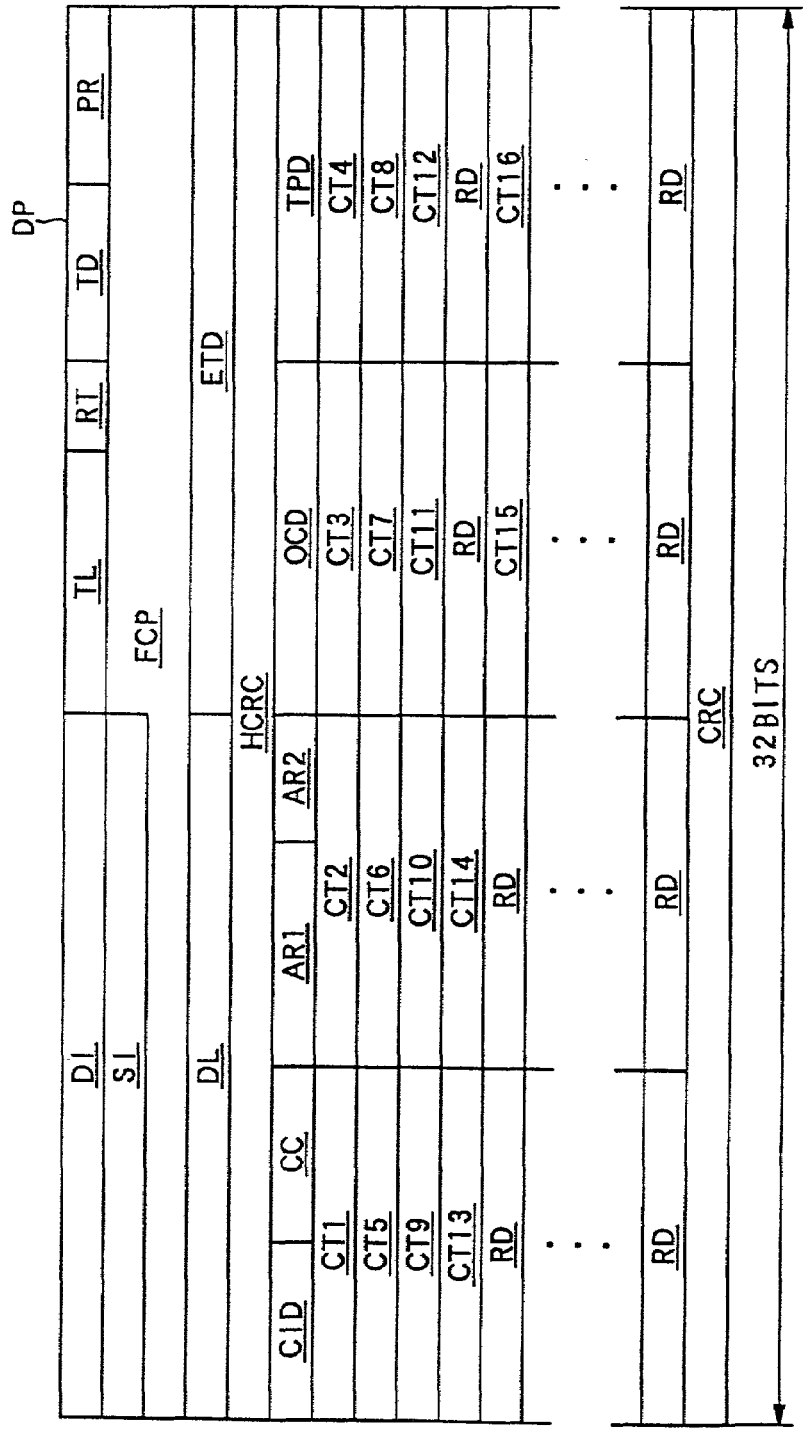
FIG. 16 is a diagram exemplifying a constitution of a data packet of the fourth embodiment of the present invention.

It should be noted that FIG. 15 is a flowchart showing a transmission processing of audio data Sad of the fourth embodiment of the present invention, FIG. 16 is a diagram showing a constitution of a data packet DP in an asynchronous transmission region ACT formed in the DVD player DV in the processing of the fourth embodiment of the present invention. Moreover, in a transmission processing shown in FIG. 15, as to a processing similar to the transmission processing in the above described first embodiment of the present invention, a similar step number is attached and the description in detail is omitted.

In the above described first to third embodiments of the present invention, although the synthesis coefficient table CT is stored in a data block DB in the isochronous packet IP and transmitted, in the following fourth to sixth embodiments of the present invention, the synthesis coefficient table CT is stored in a data packet DP in the asynchronous transmission region ACT and transmitted.

Then, the fourth embodiment of the present invention is an embodiment in the case where the transmission of audio data Sad is initiated from the state of both of the DVD player DV and the amplifier AP being switched off.

It should be noted that since the constitutions of the DVD player DV and the amplifier AP in the fourth to sixth embodiments of the present invention is entirely similar to those of the first to third embodiments of the present invention, the description in detail is omitted.

In a transmission processing of audio data Sad of the fourth embodiment, as shown in FIG. 15, to begin with, in the DVD player DV and the amplifier AP, the sending out and receiving each command (Steps S1 to S4 and S15 to S18) which is similarly performed to those of the first embodiment are performed. After that, in the DVD player DV, the reproducing processing of audio data Sad and the like is initiated (Step S5). Further, a synthesis coefficient table CT to be brought in correspondence with the audio data Sad being reproduced is read from the DVD audio disk 200 (Step S7).

Next, TP data TPD indicating the read synthesis coefficient table CT is stored as a data "1" in the above described data block DB, and transmitted to the amplifier AP (Step S71). Then, the amplifier AP receives it and update the value of the TP data TPD (set as "0" immediately after the appliance is switched on) set and memorized within the amplifier AP by that time to "1" (Step S76). It should be noted that at this time the TP data TPD is transmitted in order to force the amplifier recognize that the TP data set in the amplifier AP is changed hereinafter.

A concrete constitution of a data block DB0 including the TP data TPD to be transmitted is entirely similar to that shown in FIG. 11A.

When the sending out and receiving of TP data TPD are completed, the above described reproducing preparation completion command SC is stored in the above data packet DP in the asynchronous region ACT, and transmitted again from the amplifier AP to the DVD player DV (Step S77).

Then, the DVD player DV which has received the reproducing preparation completion command SC (Step S72) stores the synthesis coefficient table CT as well as TP data TPD (its value is "1") indicating the read (see Step S70) synthesis coefficient table CT in a data packet DP, and transmits it to the amplifier AP (Step S73). Then, the amplifier AP receives it (Step S78).

Concretely, the first string of the data packet DP including the TP data TPD and synthesis coefficient table CT, as shown in FIG. 16, is occupied with: a receiving end node identifier DI (16 bits) for identifying a node of the receiving end of the audio data Sad, which is the amplifier AP in the case of the fourth embodiment; a transaction label TL (6 bits) employed for checking between a plurality of data packets DP; a retry code RT (2 bits) indicating the method in the case of re-sending data; a transaction code TD (8 bits) indicating the kind of a data packet DP and its transmission method; and a priority code PR (8 bits) indicating the priority of the transmission.

The second to third strings of the data packet DP is occupied with: a receiving end node identifier SI (16 bits) for identifying a node of the receiving end of the audio data Sad, which is the DVD player DV in the case of the fourth embodiment; and a command region FCP (half portion of one string, 24 bits) including other commands to be transmitted in the asynchronous transmission region ACT and its answerback.

The fourth string of the data packet DP is occupied with: a data length information DL (16 bits) indicating a data length of the data packet DP; and an expanded transaction code ETD (16 bits) indicating the kind of the data packet DP and the expanded transmission method.

The fifth string of the data packet DP is occupied with: a header error correction code HCRC (32 bits) for correcting errors of data included in the first to fourth strings is stored in the fifth string and transmitted.

The sixth string of the data packet DP is occupied with: a command set identifier CID (4 bits) for identifying command sets including a plurality of the commands to be transmitted from other command sets, whose value is actually set as "0000" in the case of the fourth embodiment; a command code CC (4 bits) indicating functional classification of commands to be transmitted and the processing results of the command after transmission; a functional address data ARI (5 bits) for specifying a function per its unit in devices of the receiving end (amplifier AP in the fourth embodiment); identification address data AR2 (3 bits) for identifying functional address data ARI in the case where functional address data ARI are identical between other data packets DP; a table command OCD (8 bits) indicating that a synthesis coefficient table CT is included in the data packet DP; and TP data TPD (8 bits; the value is "1") indicating the following synthesis coefficient table CT.

The seventh string and the following strings of the data packet DP are occupied with synthesis coefficient tables to be transmitted (288 bytes) CT1 to CT16 themselves including a reserved data RD at predetermined intervals.

The last string of the data packet DP is occupied with an error correction code CRC for performing error correction of the entire data packet DP is stored and transmitted.

Then, when data packet DP including the synthesis coefficient table CT in the amplifier AP are all received, an answerback signal ACK indicating the effect of that is sent out from the amplifier AP by employing an acknowledge packet ACP (Step S79), which is received in the DVD player DV (Step S74). Then, the transmission completion of the synthesis coefficient table CT is verified in the DVD player DV.

When the transmission completion of the synthesis coefficient table CT is verified by the answerback signal, a data block DB including TP data TPA, which indicates the audio data Sad itself to be down-mix-treated and the audio data Sad, is formed and transmitted to the amplifier AP by the isochronous packet IP (Step S75). Then, it is received in the amplifier AP (Step S80).

A concrete constitution of a data block DB including the audio data Sad and TP data TPA to be transmitted (the value is "1") is entirely similar to that shown in FIG. 11C.

Then, hereinafter, a processing similar to that of the above described first to third embodiments of the present invention is carried out in the DVD player DV (Steps S11 to S12) and in the other amplifier AP (Steps S23 to S26), and the reproducing processing is terminated.

As described above, according to transmission processes of the audio data Sad and the like in the fourth embodiment, the data packet DP including the synthesis coefficient table CT and the TP data TPD is formed and outputted onto the serial bus B. Further, the data block DB including audio data Sad and TP data TPA is formed and outputted onto the serial bus B. Therefore, when the audio data Sad and the like has been received by the amplifier AP, the down mix processing of the audio data Sad is possible by associating the synthesis coefficient table CT with the audio data Sad using TP data TPD or TPA. As a result, even if the synthesis coefficient table CT has an amount (288 bytes) not capable of being included in one isochronous packet IC, the down mix processing of the audio data Sad can be carried out by precisely utilizing it.

Since the synthesis coefficient table CT is stored in the data packet DP in the asynchronous transmission region ACT and outputted onto the serial bus B, the synthesis coefficient table CT can be transmitted one by one when it is necessary.

Furthermore, the synthesis coefficient table CT can be securely transmitted between the DVD player DV and the amplifier AP connected under the serial bus standard.

(VI) Fifth Embodiment

Next, the fifth embodiment which is the other embodiment of the present invention will be described below with reference to FIG. 16 and FIG. 17.

Figure 17:
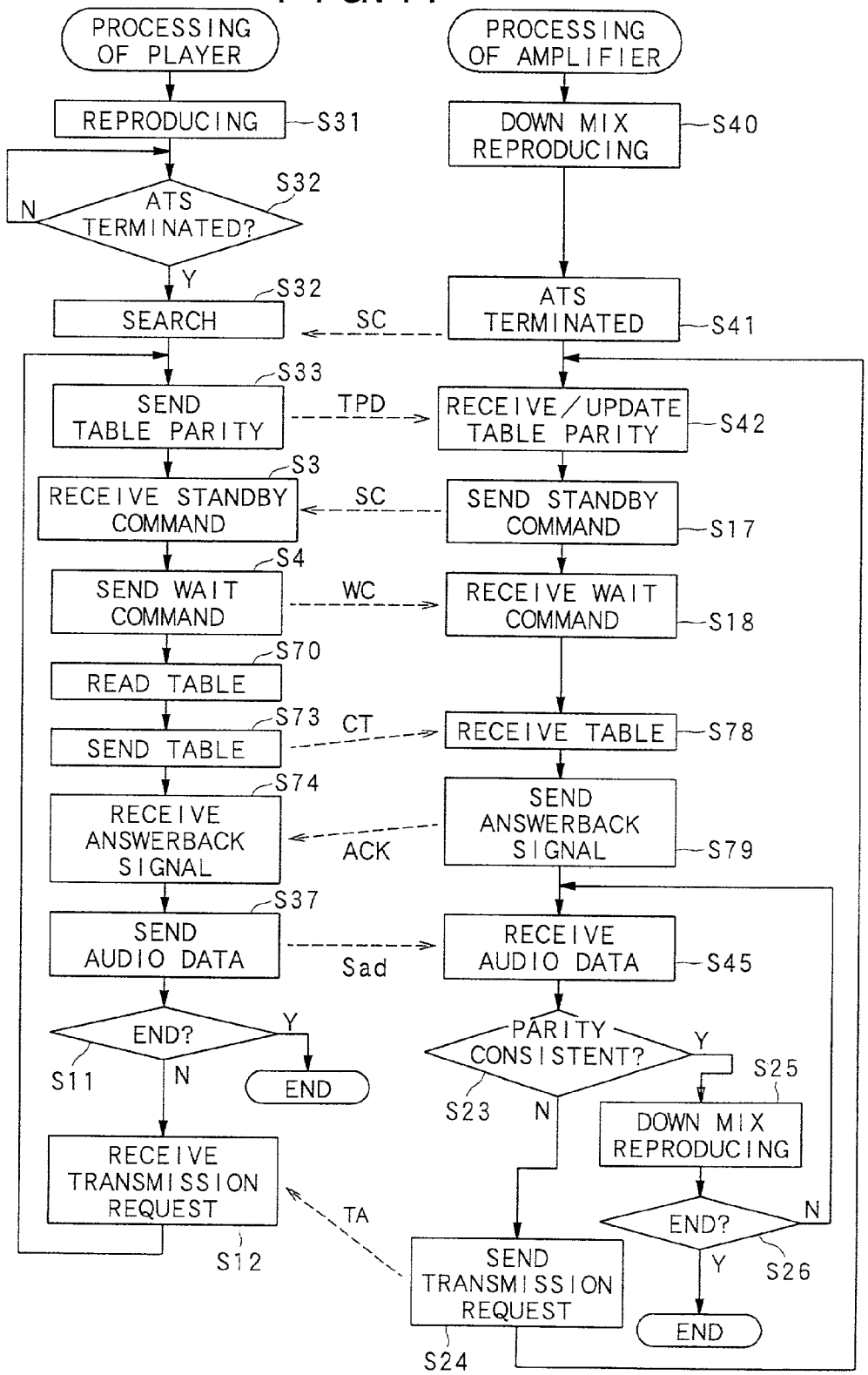
FIG. 17 is a flowchart showing a transmission processing of a synthesis coefficient table and the like of a fifth embodiment of the present invention.

It should be noted that FIG. 17 is a flowchart showing a transmission processing of audio data Sad of the fifth embodiment.

In the above described fourth embodiment, the synthesis coefficient table CT is transmitted by employing a data packet DP, specifically, the transmission of the audio data Sad is initiated from the state of the electric source is switched off for both of the DVD player DV and the amplifier AP. However, in the fifth embodiment, similarly in the second embodiment, after the reproducing accompanied with the down mix processing of audio data Sad included in one ATS 203 is completed, when the process transfers to the next reproducing of audio data Sad in the ATS 203, the reproducing processing of audio data Sad accompanied with the update processing of a synthesis coefficient table CT is carried out.

It should be noted that in a transmission processing shown in FIG. 17, as to a processing similar to those in the above described second embodiment and fourth embodiment, the similar step numbers are attached to it, and the description in detail is omitted.

As shown in FIG. 17, in a transmission processing of audio data Sad of the fifth embodiment, the reproducing processing of audio data Sad (Steps S30, S40 and S41) and the retrieval processing of a new ATS 203 (Steps S31 and S32) are carried out similar to that of the second embodiment.

Then, if the ATS 203 to be reproduced can be retrieved, in order to invert the TP data TPA set at present in the amplifier AP, a new TP data TPD is stored as a data "0" in the data block DB, and transmitted from the DVD player DV to the amplifier AP (Step S33). In the case where the fifth embodiment is viewed as continued one from the fourth embodiment, the TP data TPA is "1". Then, the new TP data TPD is received in the amplifier AP, so that the value of TP data TPD set and memorized by that time ("1") is updated to "0" (Step S42).

A concrete constitution of a data block DB0 including the TP data TPD to be transmitted is entirely similar to that shown in FIG. 11A.

When the sending out and receiving of the new TP data TPD are completed, after the sending out and receiving of the reproducing preparation completion command (Steps S17 and S3) and the sending out and receiving of the wait command WC (Steps S4 and S18) are carried out by employing a data packet DP similarly in the first embodiment, the amplifier AP waits until the above described synthesis coefficient table is received CT in the amplifier AP.

Next, the above described synthesis coefficient table CT is read from the DVD audio disk 200 in the DVD player DV (Step S7). And then, after TP data TPD (the value is "0") indicating the read synthesis coefficient table CT is transmitted to the amplifier AP again in a mode shown in FIG. 11A, and temporarily stored in the amplifier AP. After that, the synthesis coefficient table CT is stored in the data packet DP, and transmitted to the amplifier AP (Step S73). Then, it is received in the amplifier AP (Step S78).

At this moment, a concrete constitution of a data packet DP including the synthesis coefficient table CT is entirely similar to that shown in FIG. 16.

Then, when the synthesis coefficient tables CT are all received in the amplifier AP, an answerback signal ACK representing the effect of that is sent out from the amplifier AP by employing the acknowledge packet ACP (Step S79), which is received in the DVD player DV (Step S74). Then, the transmission completion of the synthesis coefficient table CT is verified in the DVD player DV.

When the transmission completion of the synthesis coefficient table CT is verified by the answerback signal, the data block DB including audio data Sad to be down-mix-treated is formed. Then, the data block DB and the corresponding TP data TPA (the value is "0") are transmitted to the amplifier AP (Step S37), which are received in the amplifier AP (Step S45).

A concrete constitution of the data block DB2 including the audio data Sad and TP data TPA to be transmitted is entirely similar to that shown in FIG. 11C.

Then, hereinafter, a processing similar to that in the above described fourth embodiment is carried out in the DVD player DV (Steps S1 to S12) and in the amplifier AP (Steps S23 to S26), and the processing is terminated.

In the case where the value of TP data TPD set and memorized in the amplifier AP by that time is "0", the TP data TPD having the value "1" is transmitted at Step S33 in the fifth embodiment in order to invert the value "0". On the other hand, in the case where the value of TP data TPD set and memorized within the amplifier AP by that time is "1", in order to invert this, the TP data TPD having the value "0" is transmitted at Step S33. And then, subsequently, the value of TP data TPD transmitted at Step S73 and the value of TP data TPA transmitted at Step S37 are set to be identical with the value of TP data TPD transmitted in this Step S33.

According to a transmission processing of the fifth embodiment, in every time when the ATS 203 is changed, while the values of TP data TPD and TPA is inverted between "0" and "1" reciprocally without any number in between, they are added to the synthesis coefficient table CT and the audio data Sad and transmitted. Therefore, when the ATS 203 is changed, even if the reproducing accompanied with the down mix processing is continued, an effect similar to that of a transmission processing of the above described fourth embodiment can be exerted.

(VII) Sixth Embodiment

Next, the sixth embodiment which is the other embodiment of the present invention will be described below with reference to FIG. 14, FIG. 16 and FIG. 18.

Figure 18:
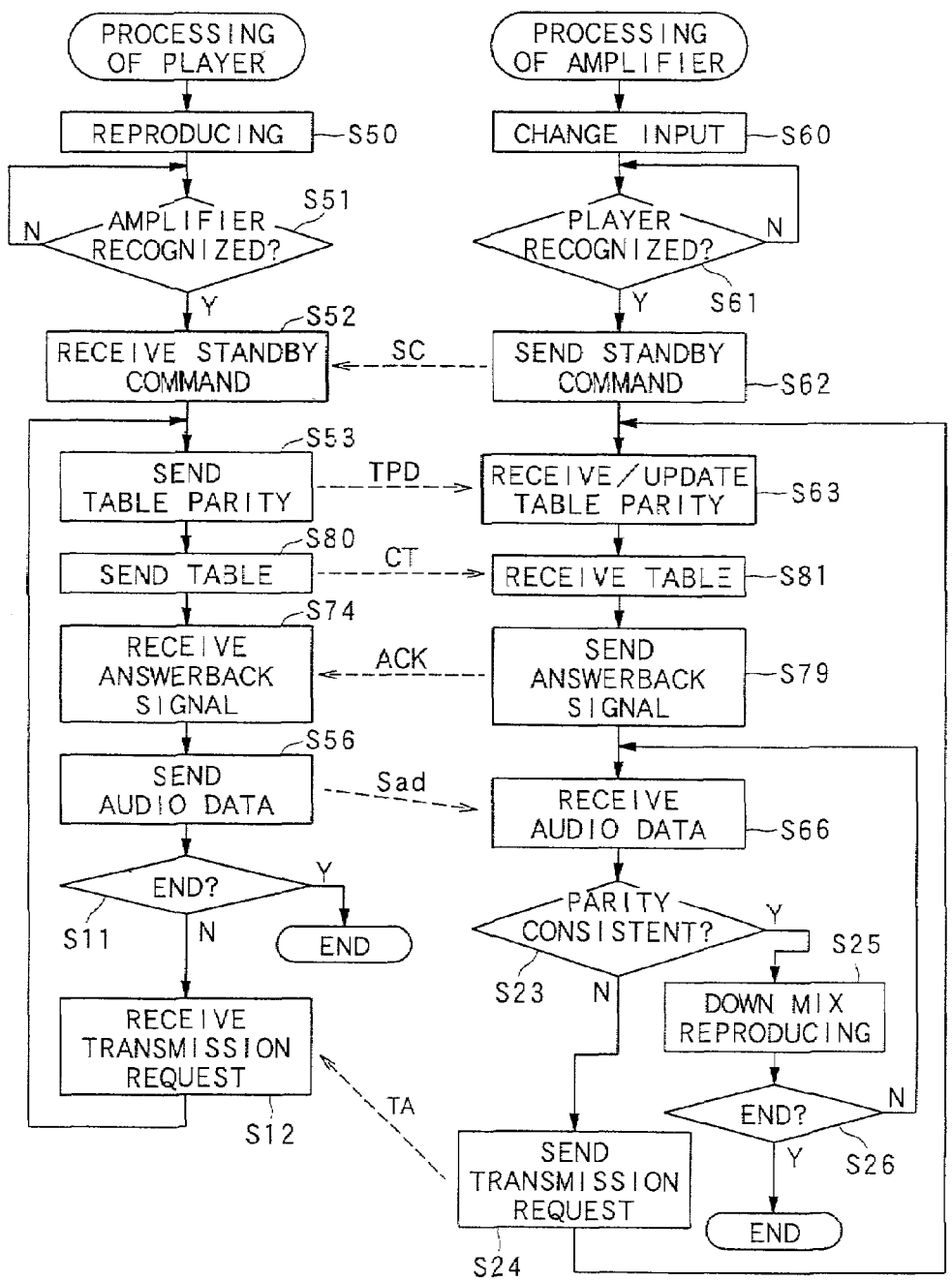
FIG. 18 is a flowchart showing a transmission processing of a synthesis coefficient table and the like of a sixth embodiment of the present invention.

It should be noted that FIG. 18 is a flowchart showing a transmission processing of audio data Sad of the sixth embodiment.

In the above described fourth and fifth embodiments, the transmission of the audio data Sad is initiated from the state of the electric source being switched off for both of the DVD player DV and the amplifier AP. In addition, the reproducing accompanied with the down mix processing immediately after the ATS 203 is changed in the reproducing of the audio data Sad in the DVD player DV. However, in the sixth embodiment, similarly in the third embodiment, in the case where the transmission of the synthesis coefficient table CT has been already initiated from the DVD player DV to the amplifier AP, when the input selection in the other amplifier AP connected to the serial bus B is changed to the DVD player DV, or when a new other amplifier AP is connected to the serial bus B, and the like, the reproducing processing of audio data Sad accompanied with the down mix processing is initiated in the other amplifier AP.

It should be noted that in a transmission processing shown in FIG. 18, as to a processing similar to that in the above described third and fourth embodiments of the present invention, the similar process numbers are attached and the description in detail is omitted.

As shown in FIG. 18, in a transmission processing of audio data Sad of the sixth embodiment, the reproducing processes similar to those of the third embodiment (Step S50), input change/reciprocal recognition processing (Steps S60, S61 and S51), the sending out and receiving of a reproducing preparation completion command SC (Steps S62 and S52) and the sending out and receiving of TP data TPD (Steps S53 and S63) are carried out in the DVD player DV and the amplifier AP.

A concrete constitution of a data block DB0 including the TP data TPD to be transmitted is entirely similar to that shown in FIG. 14A.

Then, when the sending out and receiving of TP data TPD are completed, the TP data TPD (the value is the same as the value transmitted at Step S53) indicating the synthesis coefficient table CT used at present is stored in a mode shown in FIG. 14A and transmitted from the DVD player DV to the other amplifier AP again. Then, the TP data TPD is temporarily stored in the other amplifier AP. The synthesis coefficient table CT has been already read form the DVD audio disk 200 in the reproducing processing at Step S50 and stored in the RAM 11 in the DVD player DV. After that, the synthesis coefficient table CT used at present is stored in the data packet DP in the isochronouns cycle IC including the audio data Sad being reproduced at present, and transmitted to the other amplifier AP (Step S80). Then, it is received in the other amplifier AP (Step S81).

A concrete constitution of the data packet DP including the synthesis coefficient table CT is entirely similar to that shown in FIG. 16.

Then, when all of the synthesis coefficient table CT are received, an answerback signal ACK representing the effect of that is sent out by employing the acknowledge packet ACP from the amplifier AP (Step S79). Then, it is received in the DVD player DV (Step S74). After that, the transmission completion of the synthesis coefficient table CT is verified in the DVD player DV.

When the transmission completion of the synthesis coefficient table CT is verified by the answerback signal, the data block DB including the audio data Sad to be down-mix-treated itself and TP data TPA (the value is the same as the value transmitted at Steps S53 and S80) indicating the audio data Sad whose reproducing is continued at present is formed. Then, it is transmitted to the other amplifier AP (Step S56), which is received in the other amplifier AP (Step S66).

A concrete constitution of a data block DB2 including the audio data Sad and TP data TPA to be transmitted is entirely similar to that shown in FIG. 11C as shown in FIG. 14C.

Then, hereinafter, processes similar to those of the above described fourth embodiment are carried out in the DVD player DV (Steps S11 to S12) and in the other amplifier AP (Steps S23 to S26), and the reproducing processes are terminated.

According to the transmission processing of the sixth embodiment, in the case where the transmission of the synthesis coefficient table CT has been already initiated from the DVD player DV to the amplifier AP, even if the input selection change in the other amplifier AP or the connection of the new other amplifier AP had been carried out, an effect similar to that of a transmission processing of the above described fourth or fifth embodiment of the present invention can be exerted.

(VIII) Seventh Embodiment

Next, the seventh embodiment which is the other embodiment of the present invention will be described below with reference to FIG. 14.

In the above described the first and fourth embodiments, at the time of switching the electric source on, the synthesis coefficient table CT and the audio data Sad accompanied with the sending out and receiving of a variety of kinds of commands are transmitted. In the second and fifth embodiments, during updating the synthesis coefficient table CT, the synthesis coefficient table CT and the audio data Sad accompanied with the sending out and receiving of a variety of kinds of commands are transmitted. In the third and sixth embodiments, during connecting a new amplifier AP, the synthesis coefficient table CT and the audio data Sad accompanied with the sending out and receiving of a variety of kinds of commands are transmitted.

However, in the seventh embodiment, regardless of an operational state or connecting state of the DVD player DV or the amplifier AP, the newest synthesis coefficient table CT is repeatedly transmitted at intervals previously set.

In the seventh embodiment, in every time when the synthesis coefficient table CT is updated (i.e., the reproduction of a new ATS 203 is carried out.) for the audio data Sad reproduced from the DVD player DV, subsequently, the updated synthesis coefficient table CT continues to be transmitted at time intervals previously set (e.g., 30 ms). The concrete constitution of the data block DB at this moment is entirely similar to that shown in FIG. 14B.

When the synthesis coefficient table CT is updated, a processing similar to the above described processing (e.g., Steps S6 and S19 in the first embodiment) is carried out, so that a new TP data TPD is transmitted. Therefore, the value of the TP data TPD set in the DVD player DV and in the amplifier AP by that time is inverted into the other value respectively. Namely, if "0" is set as the value, this is inverted into "1", on the other hand, if "1" is set, inverted into "0". Subsequently, the updated synthesis coefficient table CT and the TP data TPD of the same value as the value after inversion are transmitted in a mode of the data block DB shown in FIG. 14B. The TP data TPD is included in the data block DB0' shown in FIG. 14A and transmitted.

Then, when the reproducing processing accompanied with an actual down mix processing is initiated, the audio data Sad to be reproduced and the same TP data TPA as the TP data TPD set at that time are transmitted in a mode of the data block DB shown in FIG. 14C. Then, the reproducing processing is initiated.

It should be noted that during the transmission of the TP data TPD or the synthesis coefficient table CT, an identification in the amplifier AP of the fact that the TP data TPD or synthesis coefficient table CT is included in the corresponding data block DB is carried out by changing the value of address data AR of the eighth string in the data block DB depending on the data included in the eighth string. More concretely, when the TP data TPD is included in the eighth string, it is changed to be "03h". When the synthesis coefficient table CT is included in the eighth string, it is changed to be "04h".

According to the transmission method of the above described seven embodiment of the present invention, the synthesis coefficient table CT, TP data TPD and a TPA are similarly transmitted in a mode of the seventh embodiment at any of the following time: at the time of switching the electric source on; during updating synthesis coefficient table CT; or during connecting a new amplifier AP. Therefore, an effect similar to those of the above described first to third embodiments of the present invention can be exerted.

It should be noted that for example, in the case where the synthesis coefficient table CT is transmitted at intervals of 30 msec under the serial bus standard, although the data occupancy rate by the synthesis coefficient table CT is about 11%, this occupancy rate will not have an influence on the transmissions of the other data. Moreover, although a new synthesis coefficient table CT is not transmitted unless it is transmitted after 30 msec, in this regard, it has been confirmed that it would not be a problem on the reproducing processing.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-61895 filed on Mar. 2, 2000 including the specification, claims, drawings and summary is incorporated herein by reference in its entirety.

What is claimed is:

1. An audio information reproducing apparatus for reproducing audio information recorded on an information recording medium, the audio information reproducing apparatus being capable of being connected with a bus, the information recording medium wherein reproducing control information for controlling a reproducing mode of the audio information and the audio information are recorded, the reproducing control information having an amount of information larger than that capable of being inserted into one information unit formed during transmission via the bus, the audio information reproducing apparatus comprising:

a detecting device for detecting the audio information and the reproducing control information from the information recording medium; and a dividing device for dividing the detected reproducing control information into a plurality of portions so that each of said portions has an amount of information capable of being inserted into one information unit;

an outputting device for forming transmission information including a plurality of the information units and for outputting the formed transmission information to the buss, wherein the plurality of the information units includes: at least one information unit including the detected audio information; and at least one other information unit including one of said portions, wherein the output device outputs the formed transmission information two or more times so that all of said portions are transmitted.

2. The audio information reproducing apparatus according to claim 1, wherein the information unit including the reproducing control information is outputted to the bus at every time interval previously set based on the reproducing mode.

3. The audio information reproducing apparatus according to claim 1, wherein the reproducing control information is stored in a synchronous information unit transmitted in synchronization with other information units on the bus and outputted to the bus.

4. The audio information reproducing apparatus according to claim 1, wherein the reproducing control information is stored in an asynchronous information unit transmitted in non-synchronization with other information unit on the bus and outputted to the bus.

5. The audio information reproducing apparatus according to claim 1, wherein the reproducing control information is a channel number reduction control information for reproducing the audio information recorded on the information recording medium by means of two channels or more of a first channel number as audio information of a second channel number less than that of the first channel number.

6. The audio information reproducing apparatus according to claim 1, wherein the bus is a serial bus through which the transmission information is transmitted based on the IEEE 1394 standard, and the information unit is a unit which constitutes one portion of an isochronous cycle in the IEEE 1394 standard.

7. An audio information reproducing apparatus for reproducing audio information recorded on an information recording medium, the audio information reproducing apparatus being capable of being connected with a bus, the information recording medium wherein reproducing control information for controlling a reproducing mode of the audio information and the audio information are recorded, the reproducing control information having an amount of information larger than that capable of being inserted into one information unit formed during transmission via the bus, the reproducing control information being divided into a plurality of portions so that each of said portions has an amount of information capable of being inserted into one information unit, the audio information reproducing apparatus comprising:
  an inputting device for inputting transmission information including a plurality of the information units from the bus, the plurality of the information units including: at least one information unit including the audio information; and at least one other information unit including one of said portions, wherein the input device inputs the transmission information two or more times so that all of said portions are inputted;
  an extracting device for extracting the information unit from the acquired transmission information;
  an acquiring device for acquiring the audio information and the reproducing control information from a plurality of the extracted information units; and
  a reproducing device for controlling a reproducing mode of the acquired audio information by employing the reproducing control information indicated by the acquired corresponding information.

8. The audio information reproducing apparatus according to claim 7, wherein the information unit including the reproducing control information is outputted to the bus at every time interval previously set based on the reproducing mode.

9. The audio information reproducing apparatus according to claim 7, wherein the reproducing control information is stored in a synchronous information unit transmitted in synchronization with other information units on the bus and outputted to the bus.

10. The audio information reproducing apparatus according to claim 7, wherein the reproducing control information is stored in an asynchronous information unit transmitted in non-synchronization with other the information unit on the bus and outputted to the bus.

11. The audio information reproducing apparatus according to claim 7, wherein the reproducing control information is a channel number reduction control information for reproducing the audio information recorded on the information recording medium by means of two channels or more of a first channel number as audio information of a second channel number less than that of the first channel number.

12. The audio information reproducing apparatus according to claim 7, wherein the bus is a serial bus through which the transmission information is transmitted based on the IEEE 1394 standard, and the information unit is a unit which constitutes one portion of an isochronous cycle in the IEEE 1394 standard.

13. An audio information reproducing system for reproducing audio information recorded on an information recording medium, the audio information reproducing system using a bus, the information recording medium wherein reproducing control information for controlling a reproducing mode of the audio information and the audio information are recorded, the reproducing control information having an amount of information larger than that capable of being inserted into one information unit formed during transmission via the bus, the audio information reproducing system comprising a first audio information reproducing apparatus and a second audio information reproducing apparatus being connected with each other via the bus, wherein
  the first audio information reproducing apparatus comprising:
  a detecting device for detecting the audio information and the reproducing control information from the information recording medium; and
  a dividing device for dividing the detected reproducing control information into a plurality of portions so that each of said portions has an amount of information capable of being inserted into one information unit;
  an outputting device for forming transmission information including a plurality of the information units and for outputting the formed transmission information to the bus,
  wherein the plurality of the information units includes: at least one information unit including the detected audio information; and at least one other information unit including one of said portions.
  wherein the output device outputs the formed transmission information two or more times so that all of said portions are transmitted.
  the second audio information reproducing apparatus comprising:
  an inputting device for inputting transmission information including the plurality of the information units from the bus,
  an extracting device for extracting the information unit from the acquired transmission information;
  an acquiring device for acquiring the audio information and the reproducing control information from a plurality of the extracted information units; and
  a reproducing device for controlling a reproducing mode of the acquired audio information by employing the reproducing control information indicated by the acquired corresponding information.

14. An audio information reproducing method of reproducing audio information recorded on an information recording medium, the audio information reproducing method using a bus, the information recording medium wherein reproducing control information for controlling a reproducing mode of the audio information and the audio information are recorded, the reproducing control information having an amount of information larger than that capable of being inserted into one information unit formed during transmission via the bus, the audio information reproducing method comprising the processes of:
  detecting the audio information and the reproducing control information from the information recording medium;
  dividing the detected reproducing control information into a plurality of portions so that each of said portions has an amount of information capable of being inserted into one information unit;
  forming transmission information including a plurality of the information units; and
  outputting the formed transmission information to the buss,
  wherein the plurality of the information units includes: at least one information unit including the detected audio information; and at least one other information unit including one of said portions, wherein the output device outputs the formed transmission information two or more times so that all of said portions are transmitted.

15. An audio information reproducing method of reproducing audio information recorded on an information recording medium, the audio information reproducing method using a bus, the information recording medium wherein reproducing control information for controlling a reproducing mode of the audio information and the audio information are recorded, the reproducing control information having an amount of information larger than that capable of being inserted into one information unit formed during transmission via the bus, the reproducing control information being divided into a plurality of portions so that each of said portions has an amount of information capable of being inserted into one information unit, the audio information reproducing method comprising the processes of:

inputting transmission information including a plurality of the information units from the bus, the plurality of the information units including; at least one information unit including the audio information: and at least one other information unit including one of said portions, wherein the input device inputs the transmission information two or more times so that all of said portions are inputted;

extracting the information unit from the acquired transmission information;

acquiring the audio information, the reproducing control information from a plurality of the extracted information units; and controlling a reproducing mode of the acquired audio information by employing the reproducing control information indicated by the acquired corresponding information.

16. An audio information reproducing method of reproducing audio information recorded on an information recording medium, the audio information reproducing method using a bus, the information recording medium wherein reproducing control information for controlling a reproducing mode of the audio information and the audio information are recorded, the reproducing control information having an amount of information larger than that capable of being inserted into one information unit formed during transmission via the bus, the audio information reproducing method comprising a first audio information reproducing method and a second audio information reproducing method, wherein the first audio information reproducing method comprising the processes of:

detecting the audio information and the reproducing control information from the information recording medium;

a dividing device for dividing the detected reproducing control information into a plurality of portions so that each of said portions has an amount of information capable of being inserted into one information unit;

forming transmission information including a plurality of the information units; and outputting the formed transmission information to the bus, wherein the plurality of the information units includes: at least one information unit including the detected audio information; and at least one other information unit including one of said portions, wherein the output device outputs the formed transmission information two or more times so that all of said portions are transmitted, the second audio information reproducing method comprising the processes of:

inputting transmission information including the plurality of the information units from the bus, extracting the information unit from the acquired transmission information;

acquiring the audio information, the reproducing control information from a plurality of the extracted information units; and controlling a reproducing mode of the acquired audio information by employing the reproducing control information indicated by the acquired corresponding information.

17. The audio information reproducing system according to claim 13, wherein the reproducing control information is a channel number reduction control information for reproducing the audio information recorded on the information recording medium by means of two channels or more of a first channel number as audio information of a second channel number less than that of the first channel number.

18. The audio information reproducing method according to claim 14, wherein the reproducing control information is a channel number reduction control information for reproducing the audio information recorded on the information recording medium by means of two channels or more of a first channel number as audio information of a second channel number less than that of the first channel number.

19. The audio information reproducing method according to claim 15, wherein the reproducing control information is a channel number reduction control information for reproducing the audio information recorded on the information recording medium by means of two channels or more of a first channel number as audio information of a second channel number less than that of the first channel number.

20. The audio information reproducing method according to claim 16, wherein the reproducing control information is a channel number reduction control information for reproducing the audio information recorded on the information recording medium by means of two channels or more of a first channel number as audio information of a second channel number less than that of the first channel number.

* * * * *